United States Patent
Wang et al.

(10) Patent No.: US 12,265,752 B2
(45) Date of Patent: Apr. 1, 2025

(54) DISPLAY METHOD, ELECTRONIC DEVICE, AND SYSTEM

(71) Applicant: Huawei Technologies Co., Ltd., Shenzhen (CN)

(72) Inventors: Yilun Wang, Nanjing (CN); Min Liu, Nanjing (CN); Fengkai Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/284,813

(22) PCT Filed: Mar. 29, 2022

(86) PCT No.: PCT/CN2022/083745
§ 371 (c)(1),
(2) Date: Sep. 28, 2023

(87) PCT Pub. No.: WO2022/206771
PCT Pub. Date: Oct. 6, 2022

(65) Prior Publication Data
US 2024/0184501 A1 Jun. 6, 2024

(30) Foreign Application Priority Data
Mar. 31, 2021 (CN) .......................... 202110354820.0

(51) Int. Cl.
*G06F 3/04886* (2022.01)
*G06F 3/14* (2006.01)

(52) U.S. Cl.
CPC .................................. *G06F 3/1454* (2013.01)

(58) Field of Classification Search
CPC ..... G06F 3/1454; G06F 3/1462; H04W 88/04
See application file for complete search history.

(56) References Cited

U.S. PATENT DOCUMENTS

| | | | |
|---|---|---|---|
| 2012/0274588 A1 | 11/2012 | Bamba | |
| 2015/0160912 A1* | 6/2015 | Zhang | G09G 5/003 345/1.1 |
| 2015/0205524 A1* | 7/2015 | Fuke | G06F 3/03543 345/163 |

FOREIGN PATENT DOCUMENTS

| | | |
|---|---|---|
| CN | 108366062 A | 8/2018 |
| CN | 110389736 A | 10/2019 |

(Continued)

*Primary Examiner* — Abbas I Abdulselam
(74) *Attorney, Agent, or Firm* — Slater Matsil, LLP

(57) ABSTRACT

In an example, a first electronic device establishes a connection to a second electronic device. The second electronic device projects first projection data to the first electronic device; and when a distance between a third electronic device and the second electronic device is less than or equal to a preset distance, the second electronic device sends notification information to the third electronic device, where the notification information indicates that the second electronic device is performing screen projection. The third electronic device sends second projection data to the second electronic device in response to receiving the notification information. In response to receiving the second projection data, the second electronic device projects the first projection data and the second projection data to the first electronic device based on orientation information between the second electronic device and the third electronic device.

16 Claims, 26 Drawing Sheets

(56) References Cited

FOREIGN PATENT DOCUMENTS

| CN | 113691842 A | 11/2021 |
|---|---|---|
| WO | 2019236728 A9 | 12/2019 |

\* cited by examiner

Smart TV

Mobile phone A

Mobile phone B

↑ The mobile phone B moves close to the mobile phone A

DISPLAY METHOD, ELECTRONIC DEVICE, AND SYSTEM

CROSS-REFERENCE TO RELATED APPLICATIONS

This application is a national stage of International Application No. PCT/CN2022/083745, filed on Mar. 29, 2022, which claims priority to Chinese Patent Application No. 202110354820.0, filed on Mar. 31, 2021. Both of the aforementioned applications are hereby incorporated by reference in their entireties.

TECHNICAL FIELD

This application relates to the terminal field, and more specifically, to a screen projection method, an electronic device, and a system.

BACKGROUND

To improve office efficiency, a user can connect different devices to work together. For example, a display interface of one device may be projected to a display of another device for the user to view. Currently, a display interface of one device can be displayed on another device. This is mainly implemented by using a one-to-one screen mirroring technology, that is, only one-to-one projection can be implemented.

However, in a conference scenario, a launch event presentation scenario, and the like, display interfaces of a plurality of devices may need to be displayed on a same device (for example, a large-screen device) for users to view.

SUMMARY

This application provides a screen projection method, an electronic device, and a system, to display display interfaces of a plurality of devices on a same device, that is, implement many-to-one screen projection. In addition, the electronic device may implement many-to-one projection based on orientation information between the electronic devices. This helps improve screen projection experience of a user.

According to a first aspect, a system is provided, where the system includes a first electronic device, a second electronic device, and a third electronic device. The first electronic device is configured to establish a connection to the second electronic device. The second electronic device is configured to project first projection data to the first electronic device in response to detecting an operation of a user. The second electronic device is further configured to: when a distance between the third electronic device and the second electronic device is less than or equal to a preset distance, send notification information to the third electronic device, where the notification information indicates that the second electronic device is performing screen projection. The third electronic device is configured to send second projection data to the second electronic device in response to receiving the notification information. The second electronic device is further configured to, in response to receiving the second projection data, project the first projection data and the second projection data to the first electronic device based on orientation information between the second electronic device and the third electronic device.

In this embodiment of this application, when the third electronic device moves close to the second electronic device, the second electronic device may be triggered to send the notification information to the third electronic device, where the notification information indicates that the second electronic device is performing screen projection. The third electronic device may send information about a currently displayed image to the second electronic device. The second electronic device may perform screen projection to the first electronic device (for example, a large-screen device) based on a position relationship between the second electronic device and the third electronic device. Therefore, a position relationship of content on the large-screen device watched by the user is consistent with the position relationship between the second electronic device and the third electronic device. In this way, the user can simultaneously project screens of a plurality of devices to the large-screen device, and the position relationship of content on the large-screen device watched by the user may be consistent with an actual position relationship between the second electronic device and the third electronic device. This helps improve screen projection experience of the user.

In some possible implementations, the first electronic device is a projection destination device (source), and the second electronic device and the third electronic device are projection source devices (sinks).

With reference to the first aspect, in some implementations of the first aspect, the third electronic device is specifically configured to: in response to receiving the notification information, prompt the user to perform screen projection on the third electronic device and the second electronic device together; and send the second projection data to the second electronic device in response to detecting an operation that the user determines to perform screen projection on the third electronic device and the second electronic device together.

In this embodiment of this application, after receiving the notification information, the third electronic device may provide a prompt to the user, so that the user determines whether to perform screen projection on both a display interface of the second electronic device and a display interface of the third electronic device. When the user determines to perform screen projection on the display interface of the third electronic device and the display interface of the second electronic device together, the third electronic device sends the second projection data to the second electronic device, so as to implement many-to-one screen projection.

With reference to the first aspect, in some implementations of the first aspect, the third electronic device is further configured to stop, in response to detecting an operation of flipping the third electronic device by the user, sending the second projection data to the second electronic device. The second electronic device is further configured to: when the second projection data is not received, project the first projection data to the first electronic device.

In this embodiment of this application, when the third electronic device detects an operation of flipping the third electronic device by the user, the third electronic device may stop sending the projection data to the second electronic device, so that the second electronic device may project the first projection data to the first electronic device. In this way, corresponding projection data can be quickly deleted from the large-screen device. This helps improve user projection experience.

In some possible implementations, the second electronic device is further configured to: stop, in response to detecting an operation of flipping the second electronic device by a user, performing screen projection to the first electronic device; or in response to detecting an operation of flipping the second electronic device by a user, project the second projection data to the first electronic device.

With reference to the first aspect, in some implementations of the first aspect, the third electronic device is further configured to stop, in response to detecting that a screen of the third electronic device is partially or completely covered with another object, sending the second projection data to the second electronic device; and the second electronic device is further configured to: when the second projection data is not received, project the first projection data to the first electronic device.

In this embodiment of this application, when the third electronic device detects that the screen of the third electronic device is partially or completely covered with the another object, the third electronic device may stop sending the projection data to the second electronic device, so that the second electronic device may project the first projection data to the first electronic device. In this way, corresponding projection data can be quickly deleted from the large-screen device. This helps improve user projection experience.

In some possible implementations, the second electronic device is further configured to: when a screen of the second electronic device is partially or completely covered with another object, stop performing screen projection to the first electronic device, or when a screen of the second electronic device is partially or completely covered with another object, project the second projection data to the first electronic device.

With reference to the first aspect, in some implementations of the first aspect, the another object is a fourth electronic device. The second electronic device is further configured to: when a distance between the fourth electronic device and the second electronic device is less than or equal to the preset distance, send the notification information to the fourth electronic device, where the notification information indicates that the second electronic device is performing screen projection. The fourth electronic device is configured to send third projection data to the second electronic device in response to receiving the notification information. The second electronic device is further configured to, in response to receiving the third projection data, project the first projection data and the third projection data to the first electronic device based on orientation information between the second electronic device and the fourth electronic device.

In this embodiment of this application, after the screen of the third electronic device is covered with the fourth electronic device, the third electronic device may stop sending the projection data to the second electronic device. Because the distance between the second electronic device and the fourth electronic device is less than or equal to the preset distance, the fourth electronic device may send the third projection data to the second electronic device after receiving the notification information sent by the second electronic device, so that the second electronic device projects, based on the position relationship between the second electronic device and the fourth electronic device, the first projection data and the third projection data to the first electronic device. In this way, screen projection content can be quickly replaced, thereby helping improve screen projection experience of the user.

According to a second aspect, a screen projection method is provided, where the method is applied to a second electronic device, and the method includes: The second electronic device establishes a connection to a first electronic device; the second electronic device projects first projection data to the first electronic device in response to detecting an operation of a user; when a distance between a third electronic device and the second electronic device is less than or equal to a preset distance, the second electronic device sends notification information to the third electronic device, where the notification information indicates that the second electronic device is performing screen projection; the second electronic device receives second projection data sent by the third electronic device; and in response to receiving the second projection data, the second electronic device projects the first projection data and the second projection data to the first electronic device based on the orientation information between the second electronic device and the third electronic device.

With reference to the second aspect, in some implementations of the second aspect, the method further includes: In response to detecting an operation of flipping a screen of the second electronic device by the user, the second electronic device projects the second projection data to the first electronic device; or in response to detecting an operation of flipping a screen of the second electronic device by the user, the second electronic device stops projecting the screen to the first electronic device.

With reference to the second aspect, in some implementations of the second aspect, the method further includes: In response to detecting that a screen of the second electronic device is partially or completely covered with another object, the second electronic device projects the second projection data to the first electronic device; or in response to detecting that a screen of the second electronic device is partially or completely covered with another object, the second electronic device stops projecting the screen to the first electronic device.

According to a third aspect, a screen projection method is provided, where the method is applied to a third electronic device, and the method includes: When a distance between the third electronic device and a second electronic device is less than or equal to a preset distance, the third electronic device receives notification information sent by the second electronic device, where the notification information indicates that the second electronic device is performing screen projection. The third electronic device sends second projection data to the second electronic device in response to receiving the notification information.

With reference to the third aspect, in some implementations of the third aspect, that the third electronic device sends second projection data to the second electronic device in response to receiving the notification information includes: in response to receiving the notification information, prompting the user to perform screen projection on the third electronic device and the second electronic device together; and sending the second projection data to the second electronic device in response to detecting an operation that the user determines to perform screen projection on the third electronic device and the second electronic device together.

With reference to the third aspect, in some implementations of the third aspect, the method further includes: In response to detecting an operation of flipping the third electronic device by the user, the third electronic device stops sending the second projection data to the second electronic device.

With reference to the third aspect, in some implementations of the third aspect, the method further includes: In response to detecting that a screen of the third electronic device is partially or completely covered with another object, the third electronic device stops sending the second projection data to the second electronic device.

According to a fourth aspect, a system is provided, where the system includes a first electronic device, a second electronic device, and a third electronic device. The first electronic device is configured to establish a connection to the second electronic device. The second electronic device is configured to project first projection data to the first electronic device in response to detecting an operation of a user. The second electronic device is further configured to: when a distance between the third electronic device and the second electronic device is less than or equal to a preset distance, send notification information to the third electronic device, where the notification information indicates that the second electronic device is performing screen projection. The third electronic device is further configured to: in response to receiving the notification information, establish a connection to the first electronic device, and send second projection data to the first electronic device. The first electronic device is further configured to obtain orientation information between the second electronic device and the third electronic device. The first electronic device is further configured to display the first projection data and the second projection data based on the orientation information.

In this embodiment of this application, when the third electronic device moves close to the second electronic device, the second electronic device may be triggered to send the notification information to the third electronic device. The notification information indicates that the second electronic device is performing screen projection. The third electronic device may send the projection data to the large-screen device, and the first electronic device (for example, the large-screen device) may display the projection data of the second electronic device and the projection data of the third electronic device based on the position relationship between the second electronic device and the third electronic device. In this way, the user can simultaneously project screens of a plurality of devices to the large-screen device, and the position relationship of content on the large-screen device watched by the user may be consistent with an actual position relationship between the second electronic device and the third electronic device. This helps improve screen projection experience of the user.

With reference to the fourth aspect, in some implementations of the fourth aspect, the third electronic device is further configured to determine the orientation information. The first electronic device is specifically configured to receive the orientation information sent by the third electronic device.

In this embodiment of this application, when the distance between the third electronic device and the second electronic device is less than the preset distance, the third electronic device may determine the orientation information between the third electronic device and the second electronic device, so that after the connection between the third electronic device and the first electronic device is established, the third electronic device may send the orientation information between the third electronic device and the second electronic device to the first electronic device. The first electronic device (for example, the large-screen device) may display the projection data of the second electronic device and the projection data of the third electronic device based on the position relationship between the second electronic device and the third electronic device. In this way, the user can simultaneously project screens of a plurality of devices to the large-screen device, and the position relationship of content on the large-screen device watched by the user may be consistent with an actual position relationship between the second electronic device and the third electronic device. This helps improve screen projection experience of the user.

In some possible implementations, the third electronic device is specifically configured to determine the orientation information in response to receiving the notification information.

With reference to the fourth aspect, in some implementations of the fourth aspect, the second electronic device is specifically configured to determine the orientation information. The first electronic device is specifically configured to receive the orientation information sent by the second electronic device.

In some possible implementations, when sending the second projection data to the first electronic device, the third electronic device may also send a response to the second electronic device, where the response indicates that the third electronic device has projected the screen to the first electronic device. In response to receiving the response, the second electronic device may send the orientation information between the second electronic device and the third electronic device to the first electronic device. The first electronic device (for example, the large-screen device) may display the projection data of the second electronic device and the projection data of the third electronic device based on the position relationship between the second electronic device and the third electronic device. In this way, the user can simultaneously project screens of a plurality of devices to the large-screen device, and the position relationship of content on the large-screen device watched by the user may be consistent with an actual position relationship between the second electronic device and the third electronic device. This helps improve screen projection experience of the user.

With reference to the fourth aspect, in some implementations of the fourth aspect, the notification information includes connection information of the first electronic device, and the third electronic device is specifically configured to: in response to receiving the notification information, establish a connection to the first electronic device based on the connection information.

In this embodiment of this application, the second electronic device may add the connection information of the first electronic device to the notification information, so that the third electronic device can quickly establish a connection to the first electronic device, the third electronic device quickly performs screen projection to the first electronic device, and the user does not need to search for a projection destination device by using the third electronic device. This helps improve user experience.

With reference to the fourth aspect, in some implementations of the fourth aspect, the third electronic device is specifically configured to: in response to receiving the notification information, prompt the user to perform screen projection on the third electronic device and the second electronic device together; and in response to detecting an operation that the user determines to perform screen projection on the third electronic device and the second electronic device together, establish a connection to the first electronic device, and send the second projection data to the first electronic device.

In this embodiment of this application, after receiving the notification information, the third electronic device may provide a prompt to the user, so that the user determines whether to perform screen projection on both a display interface of the second electronic device and a display interface of the third electronic device. When the user determines to perform screen projection on the display interface of the third electronic device and the display interface of the second electronic device together, the third electronic device sends the second projection data to the first electronic device, so as to implement many-to-one screen projection.

With reference to the fourth aspect, in some implementations of the fourth aspect, the third electronic device is further configured to stop, in response to detecting an operation of flipping the third electronic device by the user, sending the second projection data to the first electronic device. The first electronic device is further configured to display the first projection data when the second projection data is not received.

With reference to the fourth aspect, in some implementations of the fourth aspect, the third electronic device is further configured to stop, in response to detecting that a screen of the third electronic device is partially or completely covered with another object, sending the second projection data to the first electronic device. The second electronic device is further configured to display the first projection data when the second projection data is not received.

According to a fifth aspect, a screen projection method is provided, where the method is applied to a first electronic device. The method includes: The first electronic device establishes a connection to a second electronic device. The first electronic device receives first projection data sent by the second electronic device, and displays the first projection data. The first electronic device establishes a connection to a third electronic device. The first electronic device receives second projection data sent by the third electronic device, and obtains orientation information between the second electronic device and the third electronic device. The first electronic device displays the first projection data and the second projection data based on the orientation information.

With reference to the fifth aspect, in some implementations of the fifth aspect, the obtaining orientation information between the second electronic device and the third electronic device includes: receiving the orientation information sent by the second electronic device; and receiving the orientation information sent by the third electronic device.

According to a sixth aspect, a screen projection method is provided, where the method is applied to a second electronic device. The method includes: The second electronic device establishes a connection to a first electronic device. The second electronic device projects first projection data to the first electronic device in response to detecting an operation of a user. When a distance between the third electronic device and the second electronic device is less than or equal to a preset distance, the second electronic device sends notification information to the third electronic device, where the notification information indicates that the second electronic device is performing screen projection, so that the third electronic device sends projection data to the first electronic device after receiving the notification information.

With reference to the sixth aspect, in some implementations of the sixth aspect, the method further includes: In response to detecting an operation of flipping a screen of the second electronic device by the user, the second electronic device stops projecting the screen to the first electronic device.

With reference to the sixth aspect, in some implementations of the sixth aspect, the method further includes: In response to detecting that a screen of the second electronic device is partially or completely covered with another object, the second electronic device stops projecting the screen to the first electronic device.

According to a seventh aspect, a screen projection method is provided, where the method is applied to a third electronic device. The method includes: When a distance between the third electronic device and a second electronic device is less than or equal to a preset distance, the third electronic device receives notification information sent by the second electronic device, where the notification information indicates that the second electronic device is performing screen projection. The first electronic device is a projection destination device of the second electronic device. In response to receiving the notification information, the third electronic device establishes a connection to the first electronic device, and sends second projection data to the first electronic device by using the connection.

With reference to the seventh aspect, in some implementations of the seventh aspect, that in response to receiving the notification information, the third electronic device establishes a connection to the first electronic device, and sends second projection data to the first electronic device by using the connection includes: in responding to receiving the notification information, prompting a user to perform screen projection on the third electronic device and the second electronic device together; and in response to detecting an operation that the user determines to perform screen projection on the third electronic device and the second electronic device together, the third electronic device establishes a connection to the first electronic device, and sends the second projection data to the first electronic device by using the connection.

With reference to the seventh aspect, in some implementations of the seventh aspect, the method further includes: The third electronic device determines orientation information between the third electronic device and the second electronic device; and the third electronic device sends the orientation information to the second electronic device.

With reference to the seventh aspect, in some implementations of the seventh aspect, the notification information includes connection information of the first electronic device, and that the third electronic device establishes a connection to the first electronic device includes: in response to receiving the notification information, establishing a connection to the first electronic device based on the connection information.

With reference to the seventh aspect, in some implementations of the seventh aspect, the method further includes: In response to detecting an operation of flipping the third electronic device by the user, the third electronic device stops sending the second projection data to the first electronic device.

With reference to the seventh aspect, in some implementations of the seventh aspect, the method further includes: In response to detecting that a screen of the third electronic device is partially or completely covered with another object, the third electronic device stops sending the second projection data to the first electronic device.

According to an eighth aspect, an apparatus is provided. The apparatus includes: a connection unit, configured to establish a connection to a first electronic device; a detection unit, configured to detect an operation of a user; a screen projection unit, configured to project first projection data to the first electronic device in response to detecting the operation, where the detection unit is further configured to detect that a distance between a third electronic device and the apparatus is less than or equal to a preset distance; a sending unit, configured to send notification information to the third electronic device, where the notification information indicates that the apparatus is performing screen projection; and a receiving unit, configured to receive second projection data sent by the third electronic device, where the screen projection unit is further configured to project the first projection data and the second projection data to the first electronic device based on orientation information between the apparatus and the third electronic device.

According to a ninth aspect, an apparatus is provided. The apparatus includes: a receiving unit, configured to: when a distance between the apparatus and a second electronic device is less than or equal to a preset distance, receive notification information sent by the second electronic device, where the notification information indicates that the second electronic device is performing screen projection; and a sending unit, configured to send second projection data to the second electronic device.

According to a tenth aspect, an apparatus is provided, where the apparatus includes: a connection unit, configured to establish a connection to a second electronic device; a receiving unit, configured to receive first projection data sent by the second electronic device; and a display unit, configured to display the first projection data, where the connection unit is further configured to establish a connection to a third electronic device, the receiving unit is further configured to receive second projection data sent by the third electronic device, and obtain orientation information between the second electronic device and the third electronic device, and the display unit is further configured to display the first projection data and the second projection data based on the orientation information.

According to an eleventh aspect, an apparatus is provided. The apparatus includes: a connection unit, configured to establish a connection to a first electronic device; a detection unit, configured to detect an operation of a user; a screen projection unit, configured to project first projection data to the first electronic device, where the detection unit is configured to detect that a distance between a third electronic device and the apparatus is less than or equal to a preset distance; and a sending unit, configured to send notification information to the third electronic device, where the notification information indicates that the apparatus is performing screen projection, so that the third electronic device sends projection data to the first electronic device after receiving the notification information.

According to a twelfth aspect, an apparatus is provided. The apparatus includes: a receiving unit, configured to: when a distance between the apparatus and a second electronic device is less than or equal to a preset distance, receive notification information sent by the second electronic device, where the notification information indicates that the second electronic device is performing screen projection, and the first electronic device is a projection destination device of the second electronic device; a connection unit, configured to establish a connection to the first electronic device; and a sending unit, configured to send second projection data to the first electronic device by using the connection.

According to a thirteenth aspect, an electronic device is provided, including one or more processors, a memory, and one or more computer programs. The one or more computer programs are stored in the memory. The one or more computer programs include instructions. When the instructions are executed by the electronic device, the electronic device is enabled to perform the method in any possible implementation of the second aspect, the third aspect, the sixth aspect, or the seventh aspect.

According to a fourteenth aspect, an electronic device is provided, including one or more processors, a memory, and one or more computer programs. The one or more computer programs are stored in the memory. The one or more computer programs include instructions. When the instructions are executed by the electronic device, the electronic device is enabled to perform the method in any possible implementation of the fifth aspect.

According to a fifteenth aspect, a computer program product including instructions is provided, where when the computer program product runs on a first electronic device, the electronic device is enabled to perform the method according to the second aspect, the third aspect, the sixth aspect, or the seventh aspect; or when the computer program product runs on a second electronic device, the electronic device is enabled to perform the method according to the fifth aspect.

According to a sixteenth aspect, a computer-readable storage medium is provided, including instructions, where when the instructions are run on a first electronic device, the electronic device is enabled to perform the method according to the second aspect, the third aspect, the sixth aspect, or the seventh aspect; or when the instructions are run on a second electronic device, the electronic device is enabled to perform the method according to the fifth aspect.

According to a seventeenth aspect, a chip is provided, configured to execute instructions, and when the chip runs, the chip performs the method according to the second aspect, the third aspect, the sixth aspect, or the seventh aspect; or the chip performs the method according to the fifth aspect.

DETAILED DESCRIPTION OF ILLUSTRATIVE EMBODIMENTS

Figure 1:
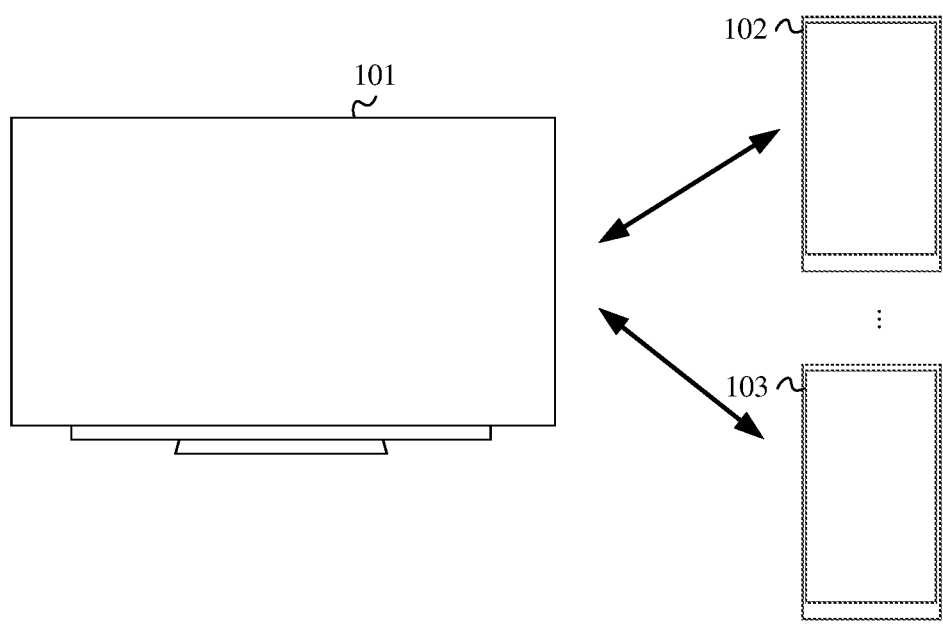
FIG. 1 is a schematic diagram of a hardware structure of an electronic device according to an embodiment of this application.

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the description of embodiments of this application, "a plurality of" means two or more than two.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the description of embodiments, "a plurality of" means two or more unless otherwise specified.

Currently, to improve office efficiency, a user may connect a plurality of electronic devices to work together. For example, after two electronic devices are connected, cooperative office between the two electronic devices may be implemented through multi-screen collaboration. During multi-screen collaboration, an interface displayed by one electronic device may be projected to a display of the other electronic device for display in a screen mirroring manner. In this embodiment, the electronic device that projects the display interface of the electronic device may be referred to as a projection source. The electronic device that receives the projection of the projection source and displays the display interface of the projection source is referred to as a projection destination (sink). An interface that is projected by the projection source and that is displayed on the projection destination is referred to as a projection interface, and a window that is used by the projection destination to display the projection interface is referred to as a projection window.

Currently, by using the screen mirroring manner, only a display interface of one electronic device can be displayed to another electronic device, that is, only one-to-one projection can be implemented. However, in a conference, a launch event presentation, or the like, display interfaces of a plurality of electronic devices may need to be displayed on a same electronic device (for example, a large-screen device), that is, there is a many-to-one projection requirement. In a related technology, projection of interfaces of a plurality of electronic devices to a display of one electronic device (for example, a large-screen device) may be implemented by using a wireless projection device (for example, an AWIND™ wireless projection gateway). However, this technology for implementing many-to-one projection needs to use a corresponding wireless screen projector.

An embodiment of this application provides a screen projection method, which may be applied to a screen projection scenario. According to the method provided in this embodiment, display interfaces of a plurality of electronic devices can be displayed on a display of a same electronic device without using another device. This meets a many-to-one projection requirement for a conference, a launch event presentation, or the like, and improves efficiency of cooperative use of the plurality of electronic devices. In addition, an electronic device may further quickly replace or delete, by identifying orientation information and a screen status of another electronic device, a projection interface displayed on a display of the large-screen device. This helps improve user projection experience.

The following describes implementations of embodiments of this application in detail with reference to accompanying drawings.

FIG. 1 is a simplified schematic diagram of a system architecture applied to an embodiment of this application. As shown in FIG. 1, the system architecture may include: a first electronic device 101, a second electronic device 102, and a third electronic device 103. The first electronic device 101 may be a projection destination (sink), and the second electronic device 102 and the third electronic device 103 each may be a projection source.

The first electronic device 101 and the second electronic device 102 may establish a connection in a wired or wireless manner. Based on the established connection, the first electronic device 101 and the second electronic device 102 may be used together. In embodiments of this application, when the first electronic device 101 and the second electronic device 102 establish a connection in the wireless manner, a used wireless communication protocol may be a wireless fidelity (Wi-Fi) protocol, a Bluetooth protocol, a ZigBee protocol, a near field communication (NFC) protocol, or the like, or may be various cellular network protocols. This is not specifically limited herein. For a manner of establishing a connection between the first electronic device 101 and the third electronic device 103 and a manner of establishing a connection between the second electronic device 102 and the third electronic device 103, refer to the foregoing manner of establishing the wireless connection between the first electronic device 101 and the second electronic device 102. Details are not described herein again.

In embodiments of this application, after the first electronic device 101 is connected to the second electronic device 102, a projection source in the first electronic device 101 and the second electronic device 102 may project an interface or some elements in an interface displayed on a display of the projection source, to a display of a projection destination for display. For example, the second electronic device 102 may project a display interface or some elements in the interface on a display of the second electronic device 102 to a display of the first electronic device 101 for display. For another example, the second electronic device 102 may further aggregate the display interface of the second electronic device 102 and a display interface of the third electronic device 103, and then project an aggregated display interface to the display of the first electronic device 101 for display.

It should be noted that the electronic device in embodiments of this application, like the first electronic device 101, the second electronic device 102, or the third electronic device 103, may be a mobile phone, a tablet computer, a handheld computer, a personal computer (PC), a cellular phone, a personal digital assistant (personal digital assistant, PDA), a wearable device (for example, a smartwatch), a vehicle-mounted computer, a game console, an augmented reality (AR)\virtual reality (VR) device, or the like. A specific form of the electronic device is not specially limited in this embodiment. Furthermore, in addition to being applied to the foregoing electronic device (or a mobile terminal), the technical solution provided in this embodiment may be further applied to another electronic device, for example, a smart home device (for example, a smart TV). Device forms of the first electronic device 101, the second electronic device 102, and the third electronic device 103 may be the same or different. This is not limited in embodiments of this application. In an example, the first electronic device 101 may be a large-screen device, for example, a PC or a smart TV, and the second electronic device 102 and the third electronic device 103 each may be a mobile device, for example, a mobile phone or a tablet computer. FIG. 1 shows an example in which the first electronic device 101 is a TV and both the second electronic device 102 and the third electronic device are mobile phones.

Figure 2:
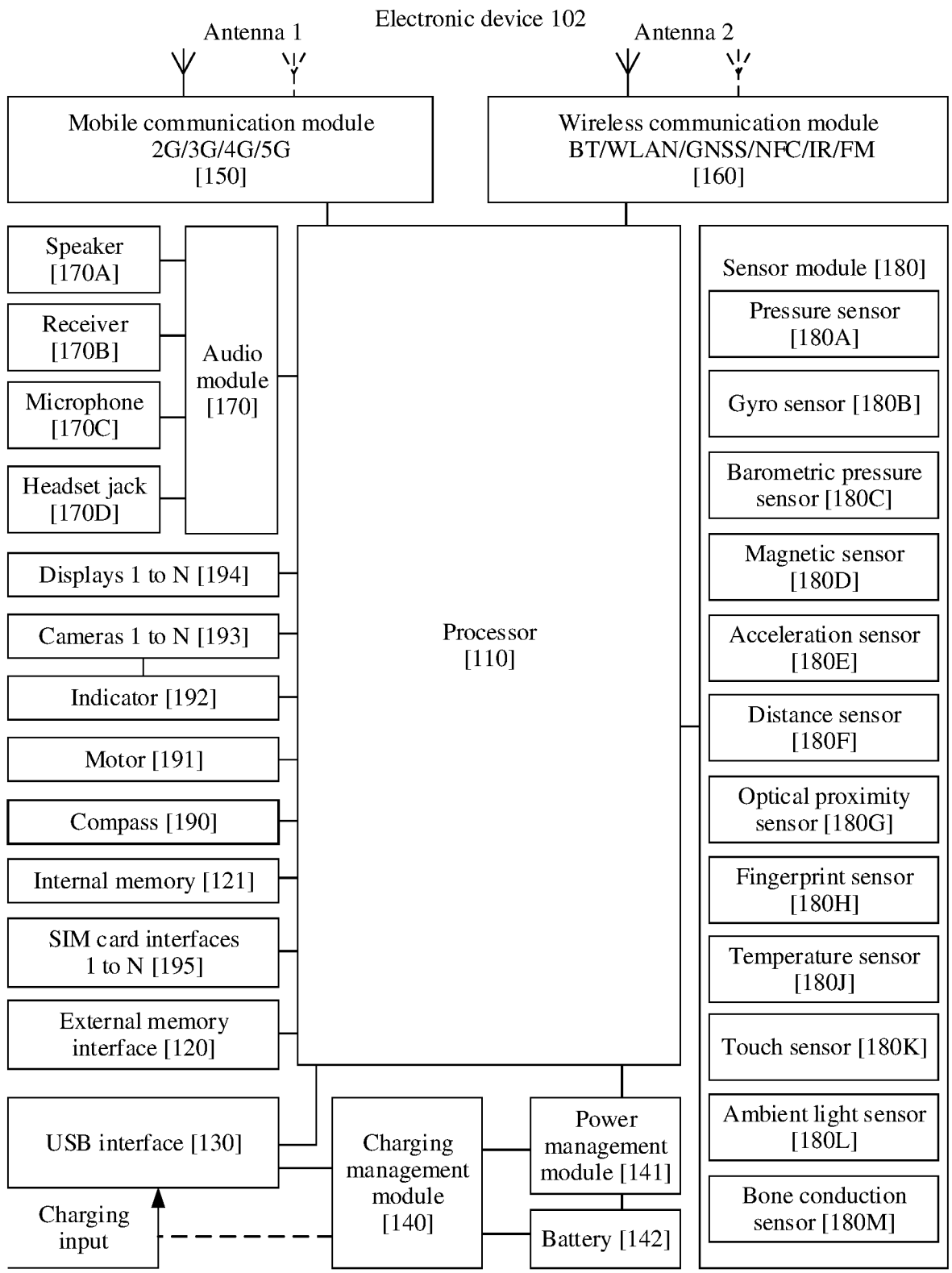
FIG. 2 is a block diagram of a software structure according to an embodiment of this application.

FIG. 2 is a schematic diagram of a structure of a mobile phone according to an embodiment of this application. Methods in the following embodiments may be implemented in a mobile phone having the foregoing hardware structure.

For example, FIG. 1 is a schematic diagram of a structure of the second electronic device 102 (or the third electronic device 103). The electronic device 102 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 102. In some other embodiments of this application, the electronic device 102 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 102. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus that includes a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 102.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component like the display 194 or the camera 193. The MIPI interface includes a camera serial interface (CSI), a display serial interface (DSI), and the like. In some embodiments, the processor 110 communicates with the camera 193 via the CSI interface, to implement a photographing function of the electronic device 102. The processor 110 communicates with the display 194 via the DSI interface, to implement a display function of the electronic device 102.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to USB standard specifications, and may be specifically a mini USB interface, a micro USB interface, a USB type-C interface, or the like. The USB interface 130 may be configured to connect to a charger to charge the electronic device 102, or may be configured to exchange data between the electronic device 102 and a peripheral device, or may be configured to connect to a headset for playing audio through the headset. The interface may be further configured to connect to another electronic device like an AR device.

It may be understood that an interface connection relationship between the modules shown in this embodiment of this application is merely an example for description, and does not constitute a limitation on the structure of the electronic device 102. In some other embodiments of this application, the electronic device 102 may alternatively use an interface connection manner different from that in the foregoing embodiments, or use a combination of a plurality of interface connection manners.

The charging management module 140 is configured to receive charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 102. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 102 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 102 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution that is for wireless communication including 2G/3G/4G/5G and the like and that is applied to the electronic device 102. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the electronic device 102, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 102 is coupled to the mobile communication module 150, and the antenna 2 is coupled to the wireless communication module 160, so that the electronic device 102 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 102 implements a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 102 may include one or N displays 194, where N is a positive integer greater than 1.

The electronic device 102 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected to the photosensitive element. The photosensitive element may be a charge-coupled device (charge-coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 102 may include one or N cameras 193, where N is a positive integer greater than 1.

The digital signal processor is configured to process a digital signal, and may process another digital signal in addition to the digital image signal. For example, when the electronic device 102 selects a frequency, the digital signal processor is configured to perform Fourier transformation on frequency energy.

The video codec is configured to compress or decompress a digital video. The electronic device 102 may support one or more video codecs. In this way, the electronic device 102 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 102 may be implemented through the NPU, for example, image recognition, facial recognition, speech recognition, and text understanding.

The external memory interface 120 may be configured to connect to an external memory card, for example, a micro SD card, to extend a storage capability of the electronic device 102. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121 to execute various function applications of the electronic device 102 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 102, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 102 may implement audio functions, for example, music playback and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 102 may listen to music or answer a hands-free call through the speaker 170A.

The receiver 170B, also referred to as an "earpiece", is configured to convert an electrical audio signal into a sound signal. When a call is answered or voice information is received by using the electronic device 102, the receiver 170B may be put close to a human ear to receive a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 102. In some other embodiments, two microphones 170C may be disposed in the electronic device 102, to implement a noise reduction function, in addition to collecting a sound signal. In some other embodiments, three, four, or more microphones 170C may alternatively be disposed in the electronic device 102, to collect a sound signal and reduce noise. The microphones may further identify a sound source, to implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 102 determines pressure intensity based on a capacitance change. When a touch operation is performed on the display 194, the electronic device 102 detects intensity of the touch operation by using the pressure sensor 180A. The electronic device 102 may further calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a motion posture of the electronic device 102. In some embodiments, an angular velocity of the electronic device 102 around three axes (namely, axes x, y, and z) may be determined through the gyro sensor 180B. The gyro sensor 180B may be configured to implement image stabilization during photographing. For example, when the shutter is pressed, the gyro sensor 180B detects an angle at which the electronic device 102 jitters, calculates, based on the angle, a distance for which a lens module needs to compensate, and allows the lens to cancel the jitter of the electronic device 102 through reverse motion, to implement image stabilization. The gyro sensor 180B may also be used in a navigation scenario and a somatic game scenario.

The barometric pressure sensor 180C is configured to measure barometric pressure. In some embodiments, the electronic device 102 calculates an altitude through the barometric pressure measured by the barometric pressure sensor 180C, to assist in positioning and navigation.

The magnetic sensor 180D includes a Hall sensor. The electronic device 102 may detect opening and closing of a flip cover by using the magnetic sensor 180D. In some embodiments, when the electronic device 102 is a clamshell phone, the electronic device 102 may detect opening and closing of a flip cover based on the magnetic sensor 180D. Further, a feature like automatic unlocking of the flip cover is set based on a detected opening or closing state of a leather case or a detected opening or closing state of the flip cover.

The acceleration sensor 180E may detect accelerations in various directions (usually on three axes) of the electronic device 102. When the electronic device 102 is still, a magnitude and a direction of gravity may be detected. The acceleration sensor 180E may be further configured to identify a posture of the electronic device, and is used in switching between a landscape mode and a portrait mode, a pedometer, or the like.

The distance sensor 180F is configured to measure a distance. The electronic device 102 may measure the distance in an infrared manner or a laser manner. In some embodiments, in a photographing scenario, the electronic device 102 may measure a distance through the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 102 emits infrared light by using the light-emitting diode. The electronic device 102 detects infrared reflected light from a nearby object through the photodiode. When sufficient reflected light is detected, it may be determined that there is an object near the electronic device 102. When insufficient reflected light is detected, the electronic device 102 may determine that there is no object near the electronic device 102. The electronic device 102 may detect, by using the optical proximity sensor 180G, that the user holds the electronic device 102 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 102 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 102 is in a pocket, to avoid an accidental touch.

The fingerprint sensor 180H is configured to collect a fingerprint. The electronic device 102 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 102 executes a temperature processing policy through the temperature detected by the temperature sensor 180J. For example, when the temperature reported by the temperature sensor 180J exceeds a threshold, the electronic device 102 lowers performance of a processor nearby the temperature sensor 180J, to reduce power consumption for thermal protection. In some other embodiments, when the temperature is less than another threshold, the electronic device 102 heats the battery 142 to prevent the electronic device 102 from being shut down abnormally due to a low temperature. In some other embodiments, when the temperature is lower than still another threshold, the electronic device 102 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the electronic device 102 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 102 may receive a key input, and generate a key signal input related to a user setting and function control of the electronic device 102.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 102. The electronic device 102 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 102 interacts with a network by using the SIM card, to implement functions such as calling and data communication. In some embodiments, the electronic device 102 uses an embedded SIM (embedded-SIM, eSIM) card, that is, an embedded SIM card. The eSIM card may be embedded into the electronic device 102, and cannot be separated from the electronic device 102.

It should be understood that a calling card in embodiments of this application includes but is not limited to a SIM card, an eSIM card, a universal subscriber identity module (universal subscriber identity module, USIM), a universal integrated circuit card (universal integrated circuit card, UICC), and the like.

FIG. 3(*a*), FIG. 3(*b*), FIG. 3(*c*), FIG. 3(*d*), and FIG. 3(*e*) show a group of graphical user interfaces (graphical user interfaces, GUI) according to an embodiment of this application.

As shown in FIG. 3(*a*), a smart TV displays a display interface of a TV series application, and a mobile phone A displays a display interface of data content 1. When detecting an operation of tapping a control 301 performed by a user, the mobile phone A may display a GUI shown in FIG. 3(*b*).

As shown in FIG. 3(*b*), in response to detecting the operation of tapping the control 301 by the user, the mobile phone A may display a function window 302, where the window 302 includes a Pic-in-Pic control, a TV projection control 303, and a playing speed selection. When the mobile phone detects an operation of tapping the projection control 303 by the user, the mobile phone A may display a GUI shown in FIG. 3(*c*).

As shown in FIG. 3(*c*), in response to the operation of tapping the control 303 by the user, the mobile phone may display a prompt box 304, where the prompt box 304 includes prompt information "Select a projection device" and a device "Smart TV" to which screen projection can be performed. The mobile phone A and the smart TV can be located in a same LAN. When the mobile phone A detects an operation of selecting the "Smart TV" 305 by the user, the mobile phone A may send, to the smart TV, projection data corresponding to the data content 1 displayed on a screen, so that the smart TV also displays a display interface of the data content 1.

It should be understood that for a screen projection process shown in FIG. 3(*a*) to FIG. 3 (*c*), refer to the existing Miracast wireless screen projection technology. Details are not described herein again.

As shown in FIG. 3(*d*), a mobile phone B displays a display interface of data content 2. When the mobile phone A detects that a distance between the mobile phone B and the mobile phone A is less than or equal to a preset distance, the mobile phone A may send notification information to the mobile phone B, where the notification information indicates that the mobile phone A is projecting a screen to the smart TV.

As shown in FIG. 3(*d*), in response to receiving the notification information sent by the mobile phone A, the mobile phone B may display a prompt box 306, where the prompt box 306 includes prompt information "Detect that the mobile phone A is projecting to the smart TV. Do you want to project to the smart TV with the mobile phone A?". When the mobile phone B detects an operation of tapping a control 307 by the user, the mobile phone B may send projection data corresponding to the currently displayed data content 2 to the mobile phone A.

As shown in FIG. 3(*e*), in responding to receiving the projection data corresponding to the data content 2, the mobile phone A may project, based on a position relationship between the mobile phone A and the mobile phone B, the projection data corresponding to the data content 1 and the projection data corresponding to the data content 2 to the smart TV.

In an embodiment, when the mobile phone B detects the operation of tapping the control 307 by the user, the mobile phone B may send, to the smart TV, the projection data corresponding to the currently displayed data content 2 and information about the position relationship between the mobile phone A and the mobile phone B. In response to receiving the projection data sent by the mobile phone A, and the projection data and the information about the position relationship between the mobile phone A and the mobile phone B that are sent by the mobile phone B, the smart TV displays, by using a display of the smart TV, a GUI shown in FIG. 3(*e*).

In an embodiment, when sending the notification information to the mobile phone B, the mobile phone A may also send the information about the position between the mobile phone A and the mobile phone B to the smart TV. When the mobile phone B detects the operation of tapping the control 307 by the user, the mobile phone B may send the projection data corresponding to the data content 2 to the mobile phone A. In response to receiving the projection data and the information about the position relationship between the mobile phone A and the mobile phone B that are sent by the mobile phone A, and the projection data sent by the mobile phone B, the smart TV displays, by using the display of the smart TV, the GUI shown in FIG. 3(*e*).

In this embodiment of this application, after the mobile phone B moves close to the mobile phone A, the mobile phone A may be triggered to send notification information to the mobile phone B. The notification information indicates that the mobile phone A is projecting a screen to the smart TV. When the mobile phone B detects that the user determines that the mobile phone B and the mobile phone A perform screen projection together, the mobile phone B may send currently displayed image information to the mobile phone A. The mobile phone A may perform screen projection to a large-screen device based on the position relationship between the mobile phone A and the mobile phone B. Alternatively, the mobile phone B may send the projection data and the position relationship between the mobile phone A and the mobile phone B to the large-screen device. Therefore, a position relationship of content on the large-screen device watched by the user is consistent with the position relationship between the mobile phone A and the mobile phone B. In this way, the user can simultaneously project screens of a plurality of devices to the large-screen device, and the position relationship of the content on the large-screen device watched by the user may be consistent with an actual position relationship between the mobile phone A and the mobile phone B. This helps improve screen projection experience of the user.

Figure 4:
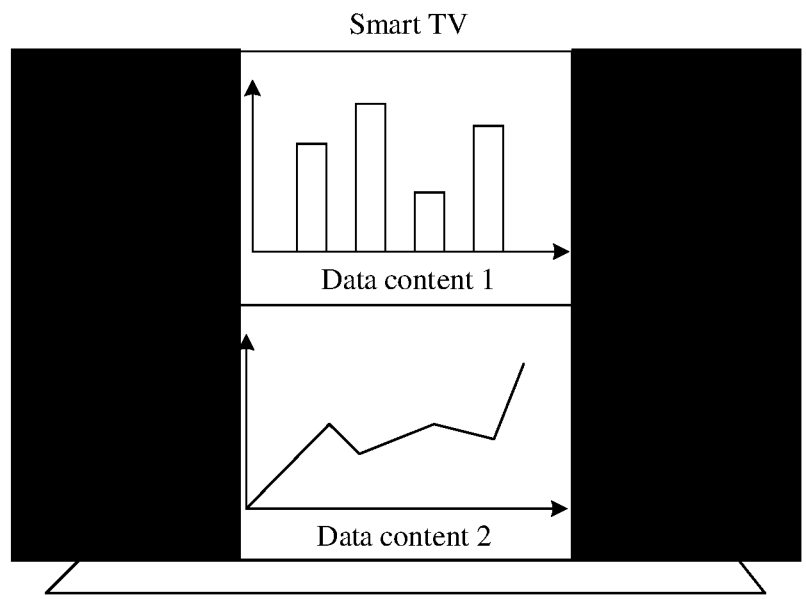
FIG. 4 shows another group of graphical user interfaces according to an embodiment of this application.
Figure 4:
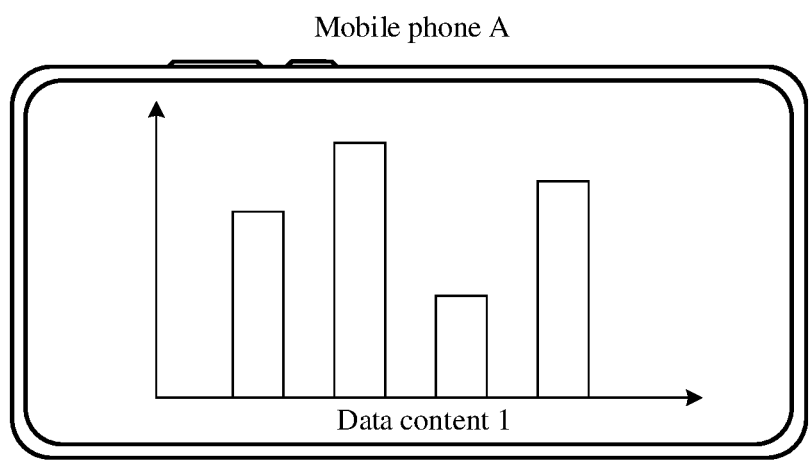
Figure 4:
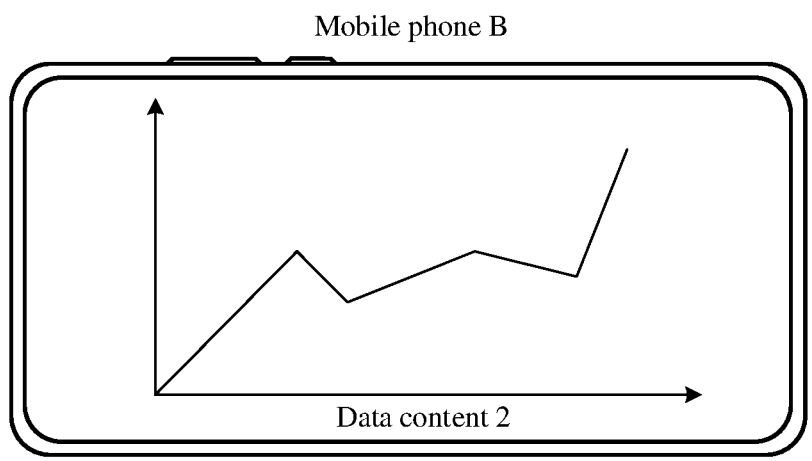

FIG. 4 shows a group of GUIs according to an embodiment of this application.

As shown in FIG. 4, the mobile phone B moves close to the mobile phone A from a lower side of the mobile phone A. When the mobile phone A detects that a distance between the mobile phone A and the mobile phone B is less than or equal to a preset distance, the mobile phone A may send notification information to the mobile phone B, where the notification information indicates that the mobile phone A is projecting a screen to the smart TV. In response to receiving the notification information, the mobile phone B may send the projection data corresponding to the data content 2 to the mobile phone A. In response to receiving the projection data corresponding to the data content 2, the mobile phone A may project the projection data corresponding to the data content 1 and the projection data corresponding to the data content 2 to the smart TV based on a position relationship between the mobile phone A and the mobile phone B.

In an embodiment, in response to receiving the notification information, the mobile phone B may send, to the smart TV, the projection data corresponding to the currently displayed data content 2 and information about the position relationship between the mobile phone A and the mobile phone B. In response to receiving the projection data sent by the mobile phone A, and the projection data and the information about the position relationship between the mobile phone A and the mobile phone B that are sent by the mobile phone B, the smart TV displays, by using the display of the smart TV, the GUI shown in FIG. 4.

In an embodiment, similarly to FIG. 3(*d*), the mobile phone B may display a prompt box in response to receiving the notification information, where the prompt box includes prompt information "Detect that the mobile phone A is projecting to the smart TV. Do you want to project to the smart TV with the mobile phone A?". In response to detecting, by the mobile phone B, the operation of tapping the determining control by the use, the mobile phone B may send the corresponding projection data to the mobile phone A, or the mobile phone B may send the corresponding projection data and the position relationship between the mobile phone A and the mobile phone B to the large-screen device.

In this embodiment of this application, after the mobile phone B moves close to the mobile phone A in different directions, a position relationship between the projection data of the mobile phone A and the projection data of the mobile phone B that are watched by the user by using the large-screen device is consistent with the position relationship between the mobile phone A and the mobile phone B. This helps improve user projection experience.

Figure 5:
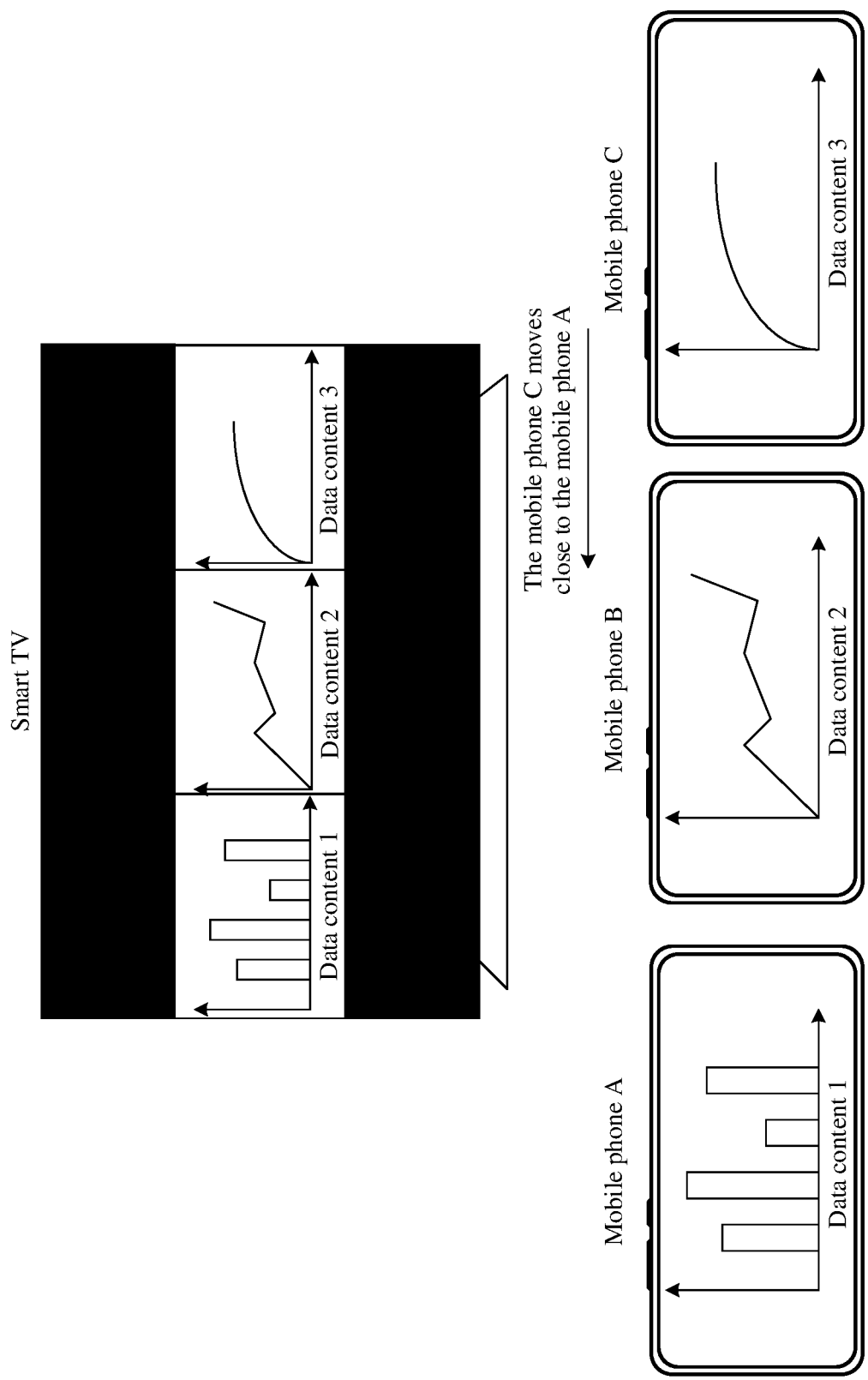
FIG. 5 shows another group of graphical user interfaces according to an embodiment of this application.

FIG. 5 shows a group of GUIs according to an embodiment of this application.

As shown in FIG. 5, a mobile phone C displays a display interface of data content 3. The user moves the mobile phone C close to the mobile phone A from a right side. When the mobile phone A detects that a distance between the mobile phone C and the mobile phone A is less than or equal to a preset distance, the mobile phone A may send notification information to the mobile phone C, where the notification information indicates that the mobile phone A is projecting a screen to the smart TV. In response to receiving the notification information, the mobile phone C may send projection data corresponding to the data content 3 to the mobile phone A. In response to receiving the projection data corresponding to the data content 3, the mobile phone A may arrange the projection data corresponding to the data content 1, the projection data corresponding to the data content 2, and the projection data corresponding to the data content 3 from left to right based on a position relationship among the mobile phone A, the mobile phone B, and the mobile phone C, and project the arranged projection data to the smart TV.

In an embodiment, when the mobile phone B detects that a distance between the mobile phone C and the mobile phone B is less than or equal to the preset distance, the mobile phone B may send the notification information to the mobile phone C, where the notification information indicates that the mobile phone B is projecting a screen to the smart TV by using the mobile phone A. In response to receiving the notification information, the mobile phone C may send the projection data corresponding to the data content 3 to the mobile phone A.

In an embodiment, similarly to FIG. 3(*d*), the mobile phone C may display a prompt box in response to receiving the notification information, where the prompt box includes prompt information "Detect that the mobile phone A is projecting to the smart TV. Do you want to project to the smart TV with the mobile phone A?". In response to detecting, by the mobile phone C, the operation of tapping the determining control by the user, the mobile phone C may send the corresponding projection data to the mobile phone A.

In an embodiment, in response to receiving the notification information, the mobile phone C may send, to the smart TV, the projection data corresponding to the currently displayed data content 3 and information about the position relationship among the mobile phone A, the mobile phone B, and the mobile phone C. In response to receiving the projection data sent by the mobile phone A, the projection data sent by the mobile phone B, and the projection data and the information about the position relationship among the mobile phone A, the mobile phone B, and the mobile phone C that are sent by the mobile phone C, the smart TV displays the GUI shown in FIG. 5 by using the display of the smart TV.

Figure 6A:
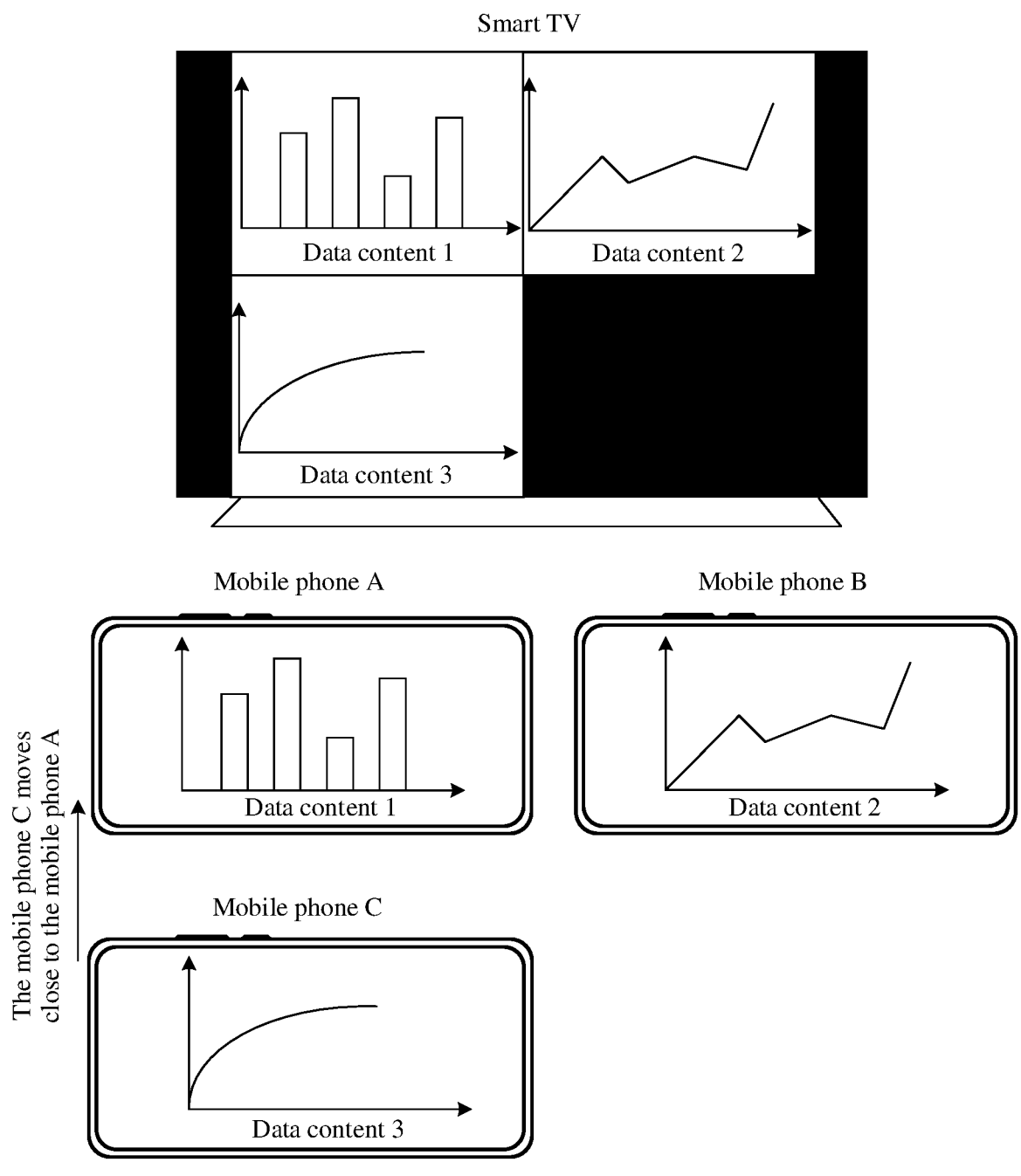
FIG. 6(a) and FIG. 6(b) show another group of graphical user interfaces according to an embodiment of this application.
Figure 6B:
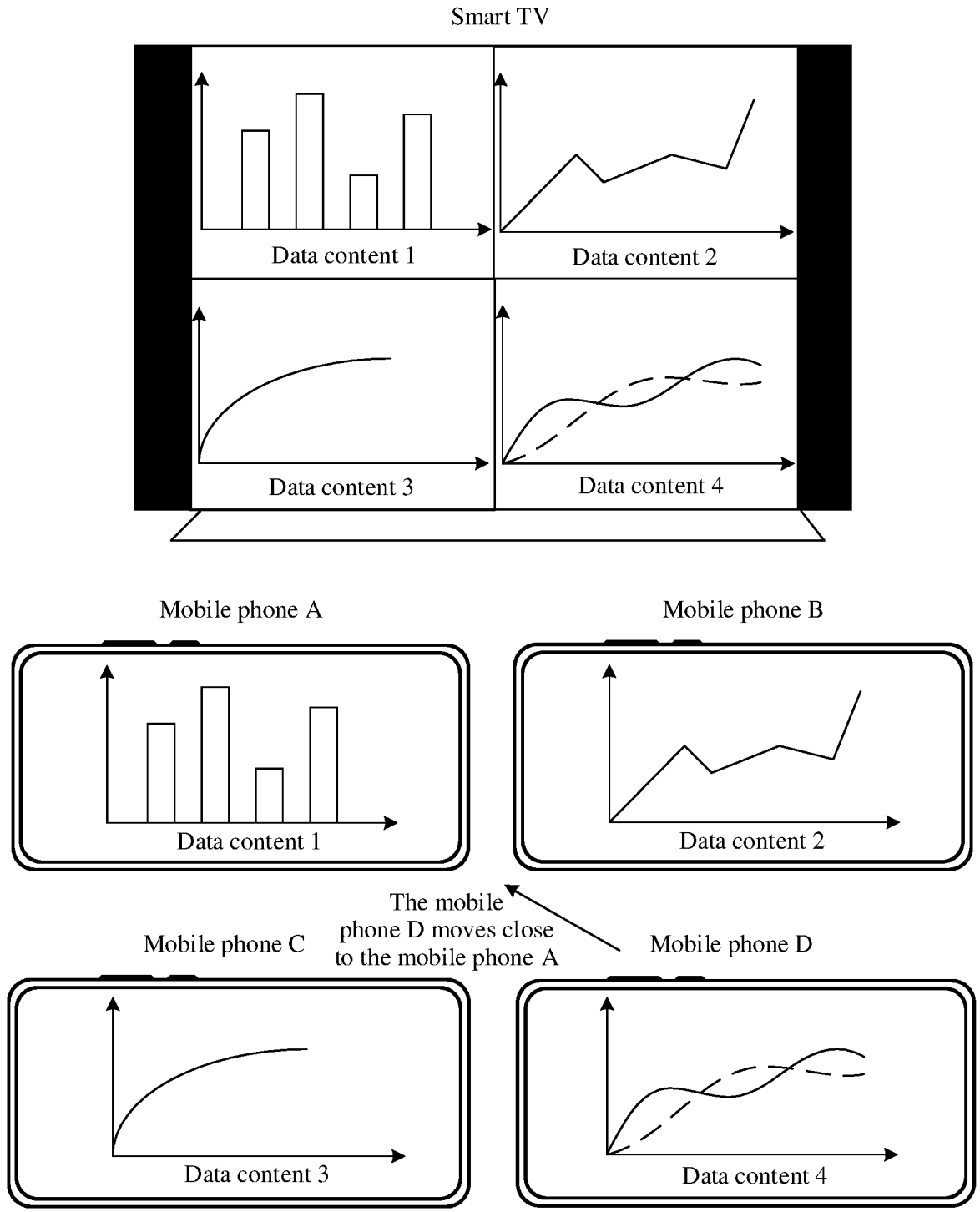

FIG. 6(*a*) and FIG. 6(*b*) show a group of GUIs according to an embodiment of this application.

As shown in FIG. 6(*a*), a difference from FIG. 5 lies in that the mobile phone C moves close to the mobile phone A from a lower side of the mobile phone A. If the mobile phone C sends the projection data corresponding to the data content 3 to the mobile phone A, the mobile phone A may arrange, based on a position relationship among the mobile phone A, the mobile phone B, and the mobile phone C, the projection data corresponding to the data content 1 and the projection data corresponding to the data content 2 left and right, and the projection data corresponding to the data content 1 and the projection data corresponding to the data content 3 up and down, and project the arranged projection data to the smart TV.

If the mobile phone C sends the projection data corresponding to the data content 3 and the position relationship among the mobile phone A, the mobile phone B, and the mobile phone C to the smart TV, the smart TV may arrange, based on the position relationship among the mobile phone A, the mobile phone B, and the mobile phone C, the projection data sent by each device. Thus, a GUI shown in FIG. 6(*a*) is displayed on the smart TV.

In this embodiment of this application, the mobile phone A may perform screen projection to the large-screen device based on the position relationship among the mobile phone A, the mobile phone B, and the mobile phone C. Alternatively, the mobile phone C may send the projection data and the position relationship among the mobile phone A, the mobile phone B, and the mobile phone C to the large-screen device. Therefore, a position relationship of content on the large-screen device watched by the user is consistent with the position relationship among the mobile phone A, the mobile phone B, and the mobile phone C. In this way, the user can simultaneously project screens of a plurality of devices to the large-screen device, and the position relationship of content on the large-screen device watched by the user may be consistent with an actual position relationship among the mobile phone A, the mobile phone B, and the mobile phone C. This helps improve screen projection experience of the user.

As shown in FIG. 6(*b*), a mobile phone D displays a display interface of data content 4. The user may move the mobile phone D close to the mobile phone A from a lower right of the mobile phone A. When the mobile phone A detects that a distance between the mobile phone D and the mobile phone A is less than or equal to a preset distance, the mobile phone A may send notification information to the mobile phone D, where the notification information indicates that the mobile phone A is projecting a screen to the smart TV and whether the mobile phone D and the mobile phone A need to perform screen projection together.

In response to receiving the notification information, the mobile phone D may send projection data corresponding to the data content 4 to the mobile phone A. In response to receiving the projection data corresponding to the data content 4, the mobile phone A may arrange, based on a position relationship among the mobile phone A, the mobile phone B, the mobile phone C, and the mobile phone D, the projection data corresponding to the data content 1 and the projection data corresponding to the data content 2 left and right, arrange the projection data corresponding to the data content 3 and the projection data corresponding to the data content 4 left and right, and arrange the projection data corresponding to the data content 1 and the projection data corresponding to the data content 3 up and down. The mobile phone A may project the arranged projection data to the smart TV.

It should be understood that the mobile phone D may also directly send, to the smart TV, the projection data corresponding to the data content 4 and the position relationship among the mobile phone A, the mobile phone B, the mobile phone C, and the mobile phone D. In this way, the smart TV displays, based on the received projection data and the position relationship among the mobile phone A, the mobile phone B, the mobile phone C, and the mobile phone D, a GUI shown in FIG. 6(b).

Figure 7A:
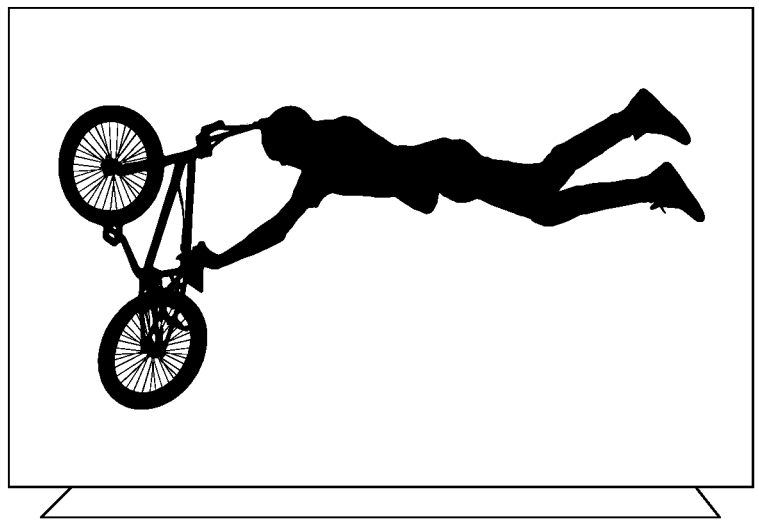
FIG. 7(a) and FIG. 7(b) show another group of graphical user interfaces according to an embodiment of this application.
Figure 7A:
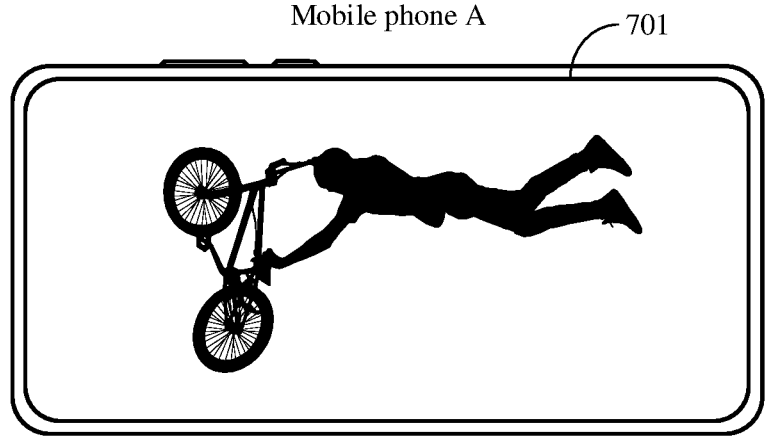
Figure 7B:
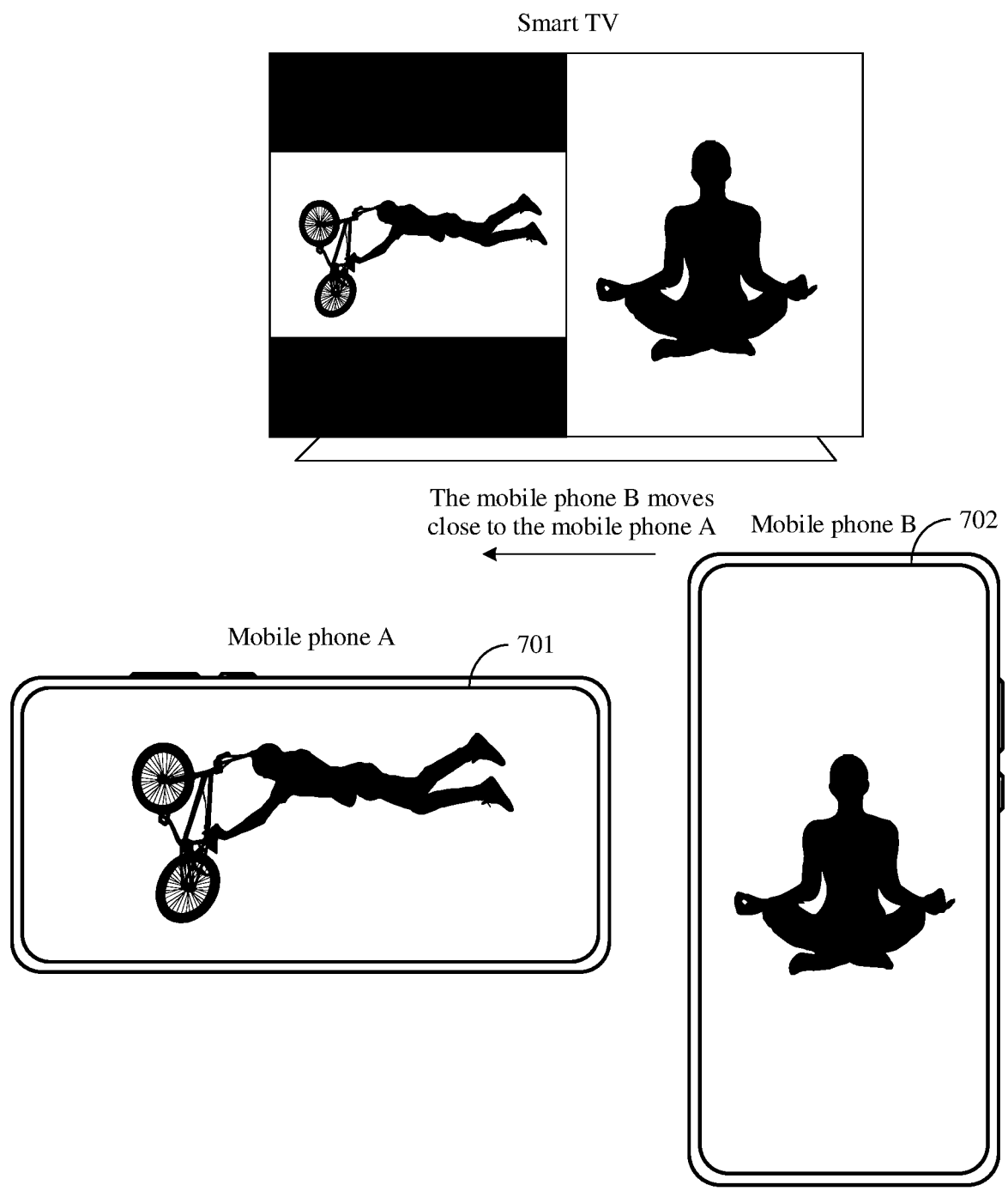

FIG. 7(a) and FIG. 7(b) show another group of GUIs according to an embodiment of this application.

As shown in FIG. 7(a), the mobile phone A is displaying a photo 701 in landscape mode, and the mobile phone A projects the photo 701 to the smart TV for display.

It should be understood that, when projecting to the smart TV, the mobile phone A may further send resolution information of the photo currently displayed by the mobile phone A to the smart TV. For example, a resolution of the photo 701 is 2340×1080 in landscape mode.

As shown in FIG. 7(b), the mobile phone B is displaying a photo 702 in portrait mode. The user moves the mobile phone B close to the mobile phone A from a right side of the mobile phone A. When the mobile phone A detects that a distance between the mobile phone B and the mobile phone A is less than or equal to a preset distance, the mobile phone A may send notification information to the mobile phone B, where the notification information indicates that the mobile phone A is projecting a screen to the smart TV. In response to receiving the notification information, the mobile phone B may send, to the mobile phone A, image information of the currently displayed photo 702 and resolution information of the photo 702. For example, a resolution of the photo 702 is 1080×2340. In response to receiving the image information and the resolution information of the photo 702, the mobile phone A may project, to the smart TV, the photo 701 in landscape mode and the photo 702 in portrait mode.

In an embodiment, in response to receiving the notification information, the mobile phone B may send, to the smart TV, projection data (the image information of the photo 702), the resolution information of the photo 702, and a position relationship between the mobile phone A and the mobile phone B. The smart TV may display, based on the received projection data, the resolution information of the photo 701, the resolution information of the photo 702, and the position relationship between the mobile phone A and the mobile phone B, a GUI shown in FIG. 7(b).

Figure 8A:
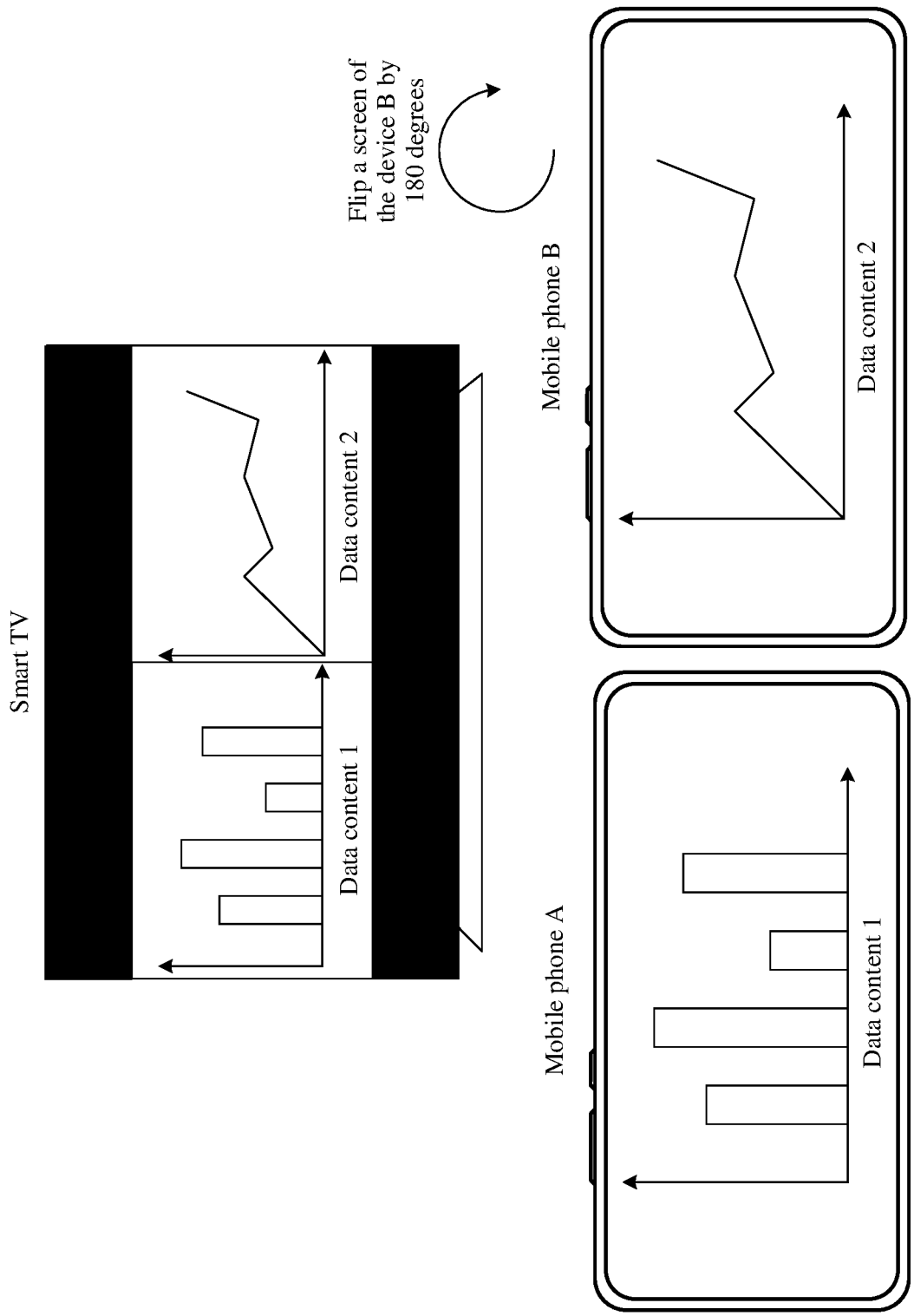
FIG. 8(a) and FIG. 8(b) show another group of graphical user interfaces according to an embodiment of this application.
Figure 8B:
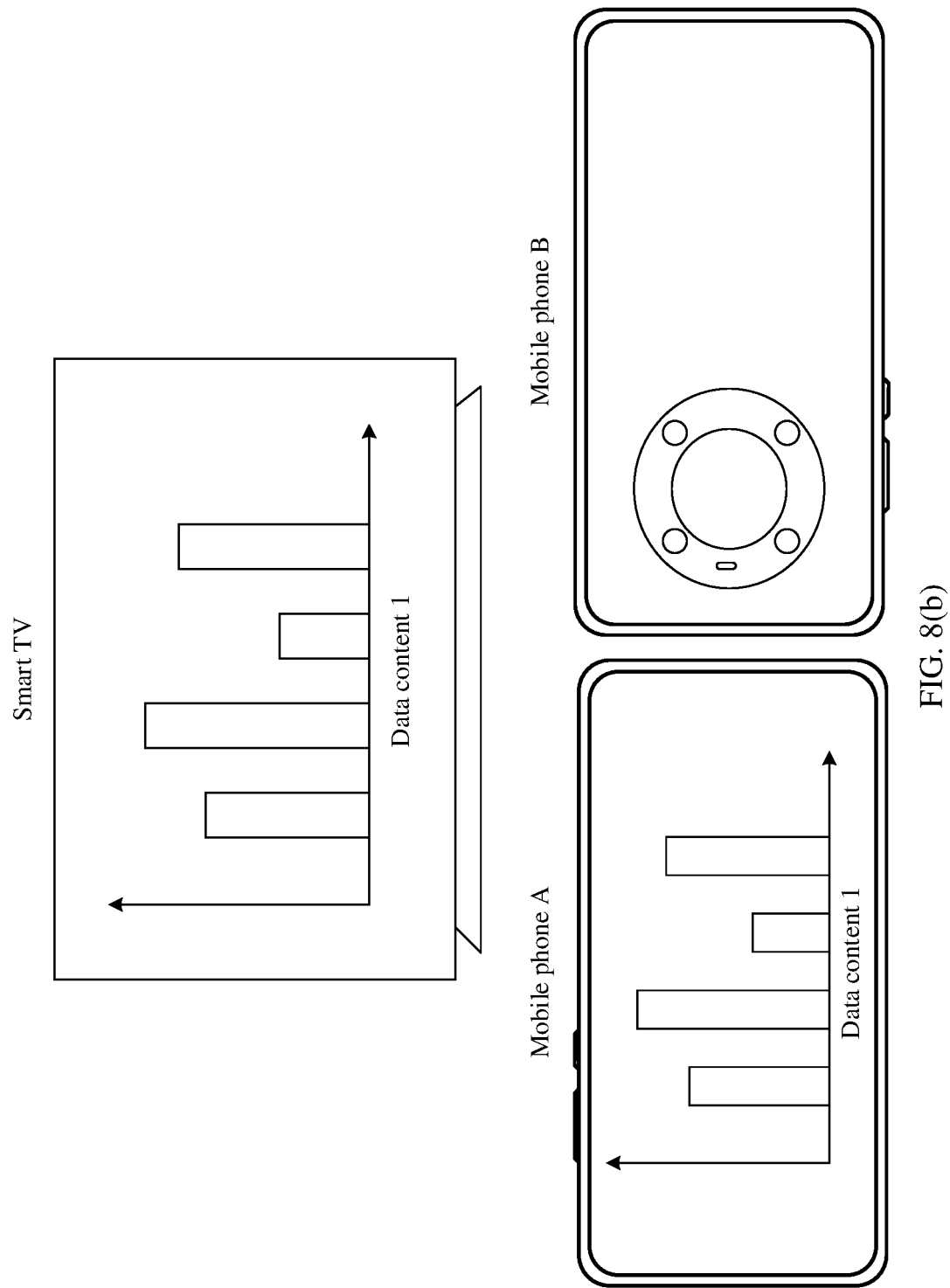

FIG. 8(a) and FIG. 8(b) show another group of GUIs according to an embodiment of this application.

As shown in FIG. 8(a), the smart TV is displaying the projection data (the data content 1) of the mobile phone A and the projection data (the data content 2) of the mobile phone B. When the mobile phone B detects an operation of flipping a screen of the mobile phone B by the user by 180 degrees, the smart TV may display a GUI shown in FIG. 8(b).

As shown in FIG. 8(b), in response to detecting the operation of flipping the screen of the mobile phone B by the user by 180 degrees, the mobile phone B may stop sending the projection data to the mobile phone A, or the mobile phone B may stop sending the projection data to the smart TV.

If the mobile phone B stops sending the projection data to the mobile phone A, the mobile phone A may send only the projection data of the mobile phone A to the smart TV, so that the smart TV displays the GUI shown in FIG. 8(b).

If the mobile phone B stops sending the projection data to the smart TV, the smart TV may display only the projection data of the mobile phone A, so that the smart TV displays the GUI shown in FIG. 8(b).

In this embodiment of this application, if a device (a source device 2) detects the operation of flipping the screen by the user by 180 degrees in a screen projection process of a plurality of devices (including a source device 1 and the source device 2), the source device 2 may stop sending projection data to the source device 1. Therefore, the source device 1 may only project content displayed by the source device to the large-screen device. In this way, it is convenient for the user to quickly end screen projection of a device. This helps to improve screen projection experience of the user.

In an embodiment, if the mobile phone B sends the projection data to the mobile phone A, when the mobile phone A performs screen projection based on a position relationship between the mobile phone A and the mobile phone B, as shown in FIG. 8(a), and the mobile phone A detects an operation of flipping the screen of the mobile phone A by the user by 180 degrees, the mobile phone A may stop performing screen projection to the smart TV, so that the smart TV stops displaying the projection data of the mobile phone A and the mobile phone B.

If the mobile phone B and the mobile phone A separately send the projection data to the smart TV, when the smart TV displays the projection data of the mobile phone A and the mobile phone B based on the position relationship between the mobile phone A and the mobile phone B, as shown in FIG. 8(a), and the mobile phone A detects the operation of flipping the screen of the mobile phone A by the user by 180 degrees, the mobile phone A may stop performing screen projection to the smart TV, and the mobile phone B may continue to perform screen projection to the smart TV. After receiving only the projection data of the mobile phone B, the smart TV may display only the projection data of the mobile phone B.

In an embodiment, when the mobile phone A detects that a distance between the mobile phone A and the mobile phone B is greater than a preset distance, the mobile phone A may stop receiving the projection data sent by the mobile phone B, so that the mobile phone A may only project content displayed by the mobile phone A to the smart TV. Alternatively, when the mobile phone A detects that the distance between the mobile phone A and the mobile phone B is greater than the preset distance, the mobile phone A may indicate the smart TV to stop receiving the projection data sent by the mobile phone B, so that the smart TV may display only the projection data of the mobile phone A.

Figure 9A:
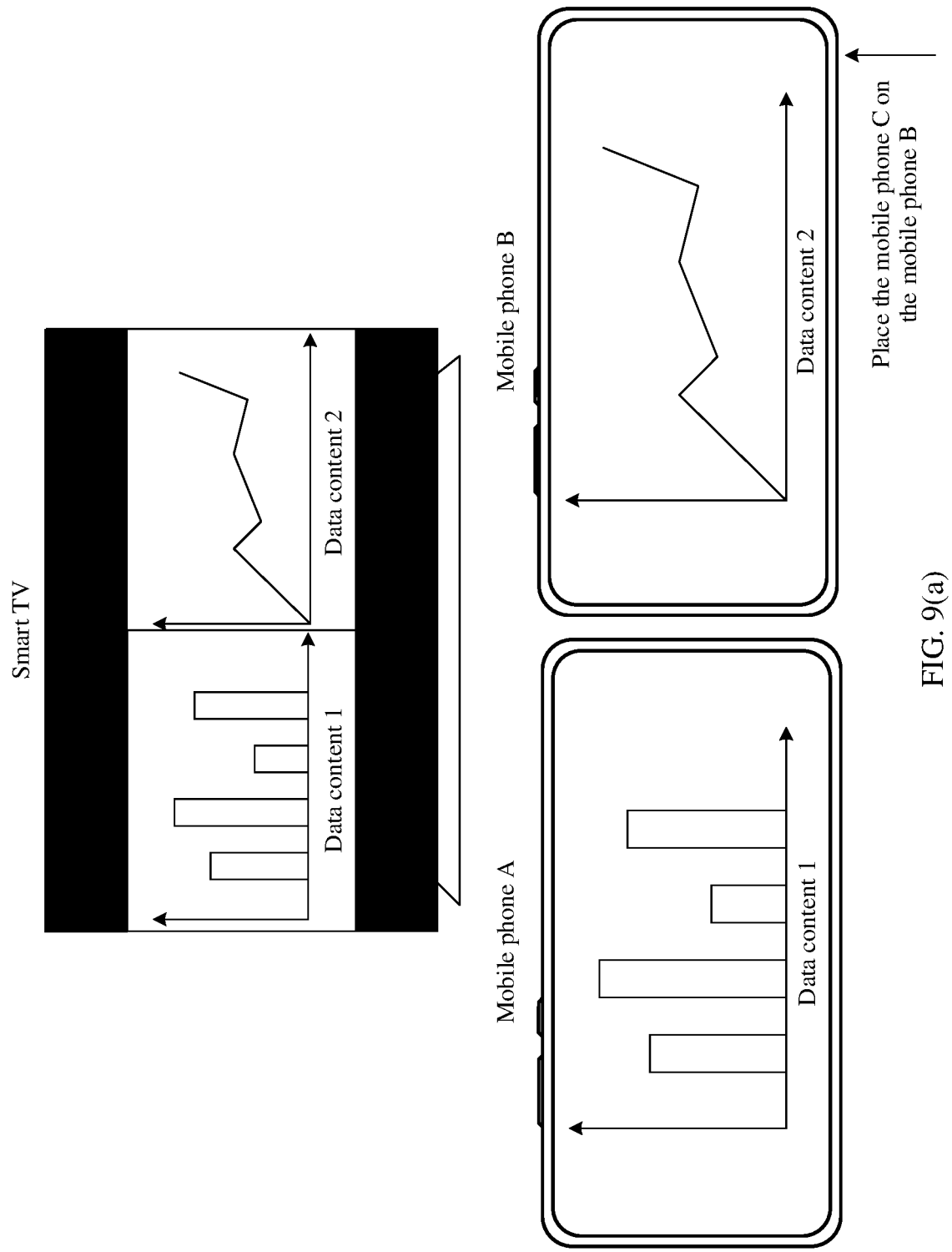
FIG. 9(a) and FIG. 9(b) show another group of graphical user interfaces according to an embodiment of this application.
Figure 9B:
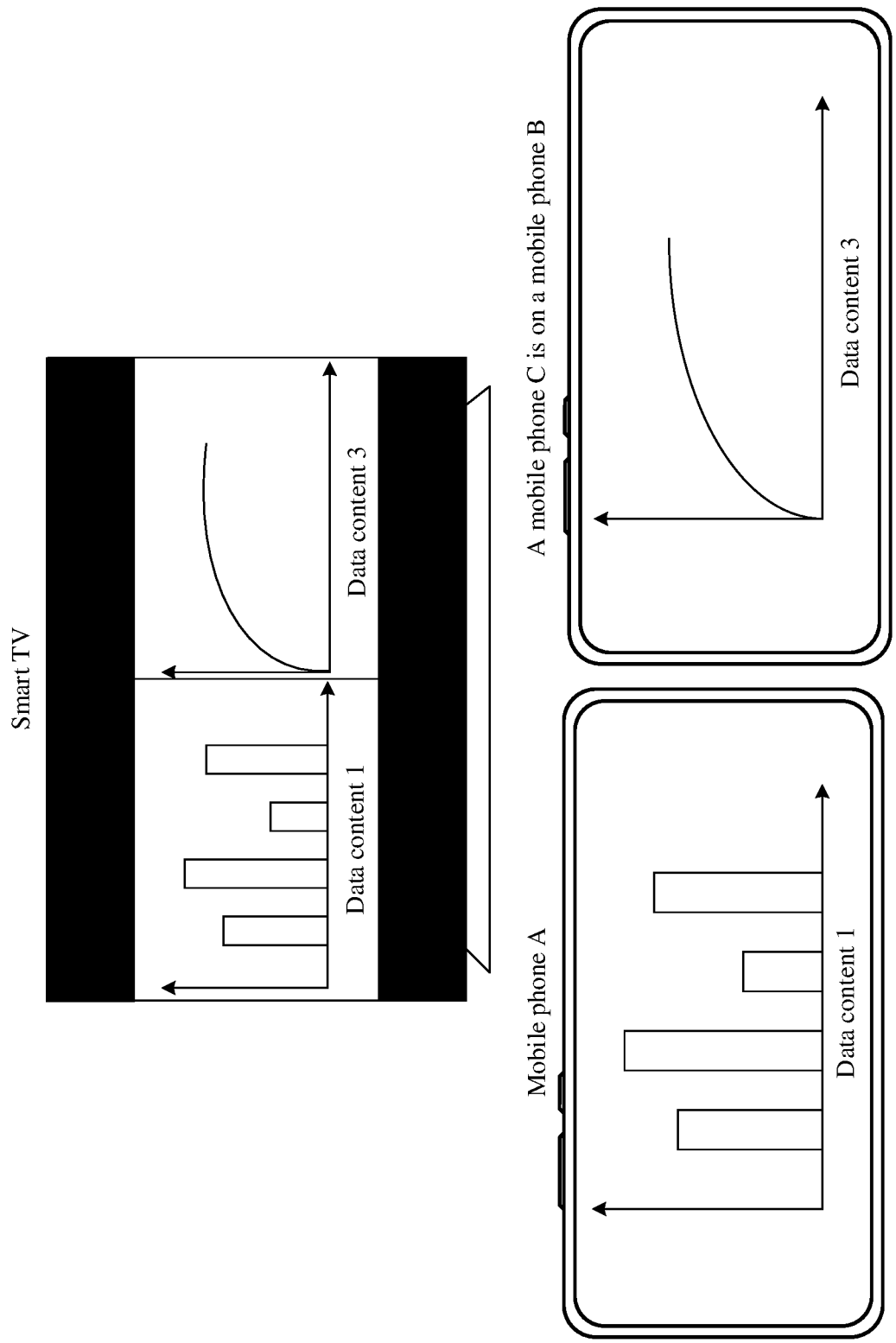

FIG. 9(a) and FIG. 9(b) show another group of GUIs according to an embodiment of this application.

As shown in FIG. 9(a), the smart TV is displaying the projection data (the data content 1) of the mobile phone A and the projection data (the data content 2) of the mobile phone B. When the mobile phone B detects that a screen of the mobile phone B is covered with an object, the smart TV may display a GUI shown in FIG. 9(b).

As shown in FIG. 9(b), the mobile phone C displays the display interface of the data content 3. When the mobile phone B detects that the screen of the mobile phone B is covered with the object, the mobile phone B may stop sending the projection data (image information of the data content 2) to the mobile phone A. In this case, the screen of the mobile phone B is covered with the mobile phone C. When the mobile phone A detects that a distance between the mobile phone A and the mobile phone C is less than or equal to a preset distance, the mobile phone A may send notification information to the mobile phone C, to trigger the smart TV to display the data content 1 and the data content 3.

It should be understood that for a process in which the mobile phone A sends the notification information to the mobile phone C and a process after the mobile phone C receives the notification information, reference may be made to the descriptions in the foregoing embodiments. Details are not described herein again.

The foregoing describes several groups of GUIs provided in embodiments of this application with reference to FIG. 3(a) to FIG. 9(b). The following describes an implementation process of embodiments of this application with reference to the accompanying drawings.

Figure 10:
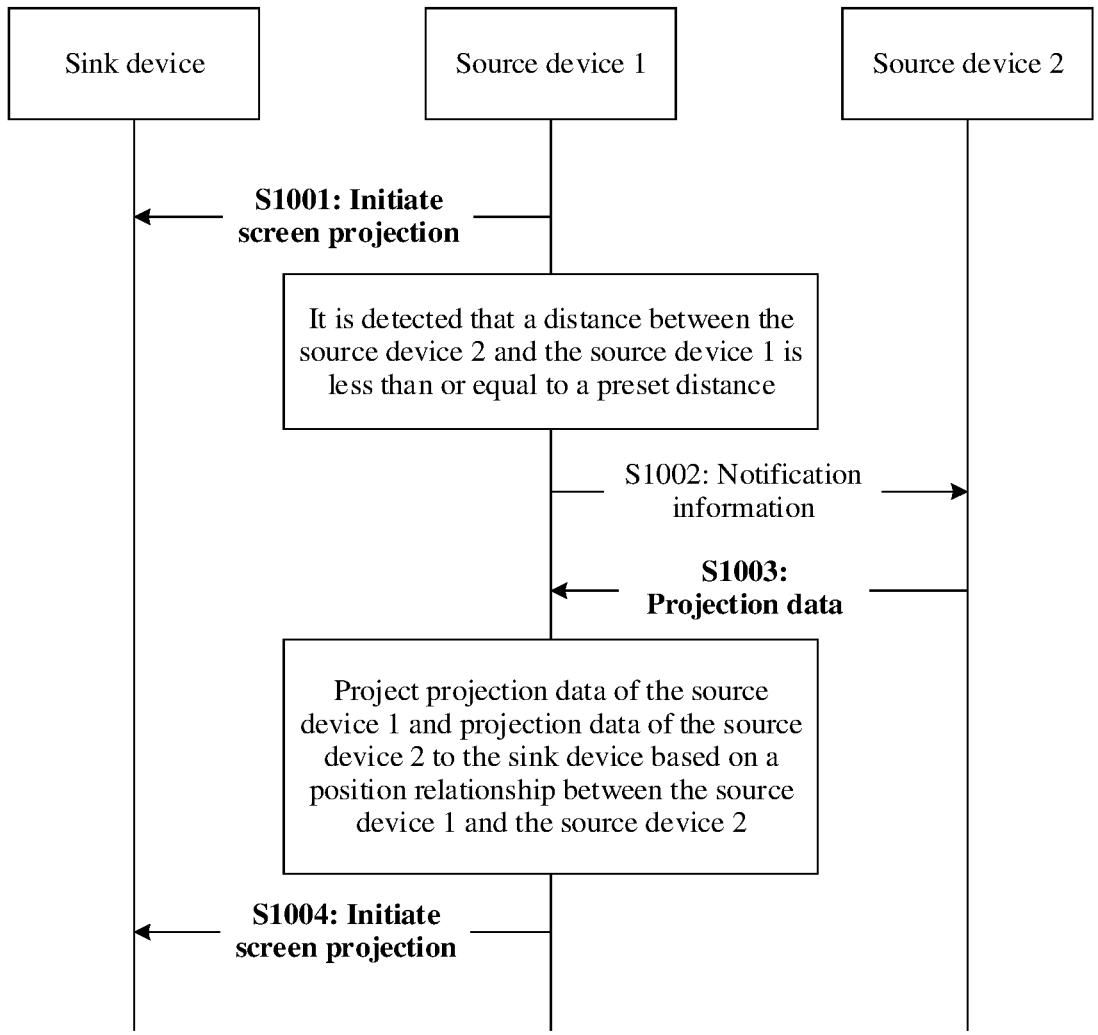
FIG. 10 is a schematic flowchart of a screen projection method according to an embodiment of this application.

FIG. 10 is a schematic flowchart of a screen projection method 1000 according to an embodiment of this application. The method may be performed by a source device 1, a source device 2, and a sink device. The source device 1 and the source device 2 may be a projection source. The sink device can be a projection destination. As shown in FIG. 10, the method 1000 includes the following steps.

S1001: The source device 1 initiates screen projection to the sink device.

It should be understood that for a process of S1001, reference may be made to an existing screen projection technology (for example, a Miracast wireless screen projection technology). Details are not described herein again.

In an embodiment, after enabling projection, the source device 1 may start to listen to a broadcast message (for example, Bluetooth low energy (Bluetooth low energy, BLE) data packet or user datagram protocol (user datagram protocol, UDP) data packet sent by a surrounding device).

S1002: When the source device 1 detects that a distance between the source device 1 and the source device 2 is less than or equal to a preset distance, the source device 1 sends notification information to the source device 2, where the notification information indicates that the source device 1 is performing screen projection, or the source device 1 is currently in a projection state.

For example, the source device 1 sends a BLE data packet to the source device 2, where the BLE data packet may carry the notification information, and the notification information indicates that the source device 1 is performing screen projection. The BLE data packet includes a protocol data unit (protocol data unit, PDU). The notification information may be carried in a service data (service data) field in the PDU, or may be carried in a manufacturer specific data (manufacturer specific data) field in the PDU. For example, a payload (payload) of the service data field may include a plurality of bits. The plurality of bits include an extensible bit. The source device 1 and the source device 2 may agree on content of an extensible bit. For example, when an extensible bit is 1, the source device 2 may learn that the source device 1 is performing screen projection.

For example, the source device 1 sends a UDP data packet to the source device 2, where the UDP data packet may carry the notification information, and the notification information indicates that the source device 1 is performing screen projection. The UPD packet includes a data part of an IP datagram. The data part of the IP datagram may include extensible bits. The source device 1 and the source device 2 may agree on content of an extensible bit. When an extensible bit is 1, the source device 2 may learn that the source device 1 is performing screen projection.

For example, the source device 1 sends a transmission control protocol (transmission control protocol, TCP) data packet to the source device 2, where the TCP data packet may carry notification information. The TCP data packet includes a TCP header and a TCP data part, and the notification information may be carried in the TCP data part. For example, the TCP data part may include a plurality of bits, where the plurality of bits include extensible bits. The source device 1 and the source device 2 may agree on content of an extensible bit. When an extensible bit is 1, the source device 2 may learn that the source device 1 is performing screen projection.

It should be understood that, in this embodiment of this application, for a process in which the source device 1 determines that the distance between the source device 1 and the source device 2 is less than or equal to the preset distance and a process in which the source device 1 determines a position relationship between the source device 1 and the source device 2, reference may be made to an existing implementation. For example, FIG. 11 is a schematic diagram in which the source device 1 determines detection of a distance between the source device 1 and the source device 2.

Figure 11:
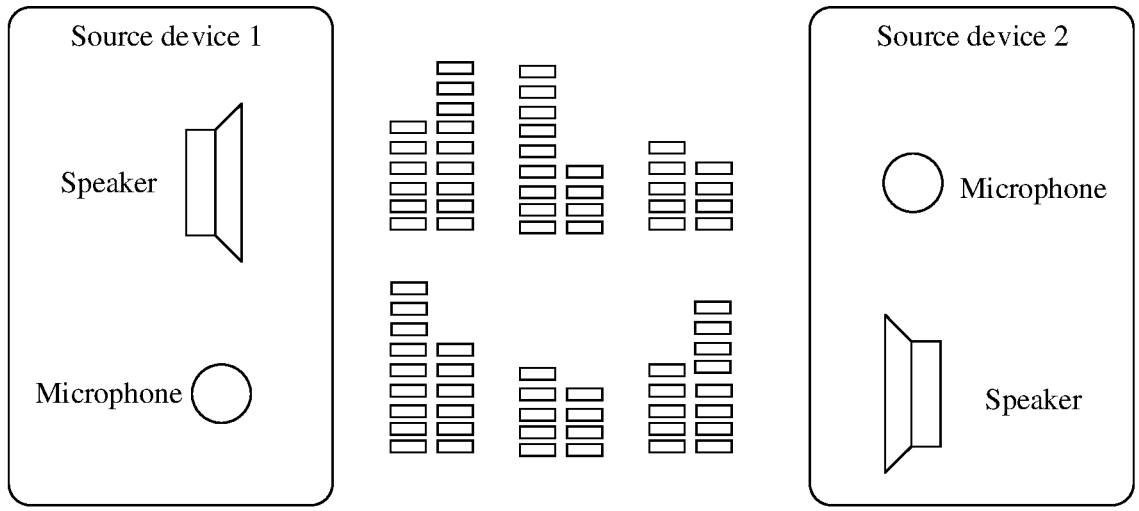
FIG. 11 is a schematic diagram in which a source device 1 determines detection of a distance between the source device 1 and a source device 2 according to an embodiment of this application.

As shown in FIG. 11, both the source device 1 and the source device 2 may include a speaker and a microphone, and may simultaneously send and receive different ultrasonic sequence signals. The source device 1 and the source device 2 may calculate a distance between the source device 1 and the source device 2 based on the received ultrasonic sequence signal.

Figure 12:
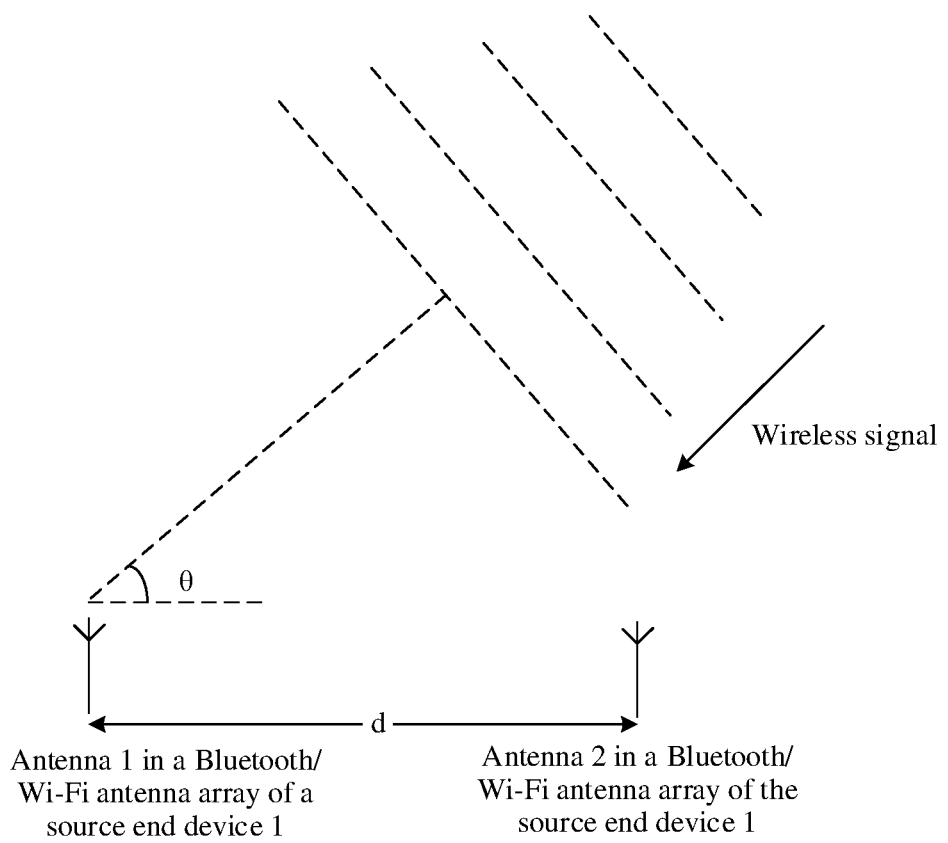
FIG. 12 is a schematic diagram in which a source device 1 determines a position relationship between the source device 1 and a source device 2 according to an embodiment of this application.

In this embodiment of this application, in addition to an ultrasonic sequence used to detect the distance between the source device 1 and the source device 2, a Bluetooth/Wi-Fi antenna array may also be used to detect the distance between the source device 1 and the source device 2. For example, as shown in FIG. 12, the source device 2 may send a wireless signal to the source device 1. The Bluetooth/Wi-Fi antenna array of the source device 1 may measure the distance between the source device 1 and the source device 2 based on signal strength or signal quality of the received wireless signal.

The source device 1 may perform distance measurement based on signal strength or signal quality of a radio signal received by one antenna in the Bluetooth/Wi-Fi antenna array. Alternatively, the source device 1 may perform distance measurement based on signal strength or signal quality of radio signals received by two antennas in the Bluetooth/Wi-Fi antenna array, and finally may process (for example, average) measurement results of the two antennas to obtain a final distance detection result. Alternatively, the source device 1 may perform distance measurement based on signal strength or signal quality of radio signals received by all three antennas in the Bluetooth/Wi-Fi antenna array, and finally may process (for example, average) measurement results of the three antennas to obtain a final distance detection result.

The signal strength and the signal quality (the following uses a long term evolution (long term evolution, LTE) system as an example for description) in this embodiment of this application may include one or more of the following parameters:

(1) reference signal received power (reference signal received power, RSRP);

(2) received signal strength indicator (received signal strength indicator, RSSI);

(3) reference signal received quality (reference signal received quality, RSRQ); and (4) signal to interference plus noise ratio (signal to interference plus noise ratio, SINR).

FIG. 12 is a schematic diagram in which a source device 1 determines a position relationship between a source device 1 and a source device 2. As shown in FIG. 12, the source device 1 has a Bluetooth/Wi-Fi antenna array. (Alternatively, the source device 1 has an angle of arrival (angle of arrival, AOA) computing power.) The source device 1 may calculate an orientation of the source device 2. The Bluetooth/Wi-Fi antenna array of the source device 1 may receive a wireless signal of the source device 2, and calculate an orientation of the source device 2 according to formulas (1) and (2):

$$\varphi = (2\pi d \cos(\theta))/\lambda \qquad (1)$$

$$\theta = \cos^{-1}((\varphi\lambda)/(2\pi d)) \qquad (2)$$

Herein, d is a distance between the Bluetooth/Wi-Fi antenna array of the source device 1 and a Bluetooth/Wi-Fi antenna of the source device 2. φ is a phase difference between the Bluetooth/Wi-Fi antenna array of the source device 1 and the Bluetooth/Wi-Fi antenna of the source device 2. λ is a wavelength of a Bluetooth signal sent by the source device 2. θ is an angle of arrival. It should be understood that, in this embodiment of this application, that the source device 1 calculates the orientation of the source device 2 may also be understood that the source device 1 may calculate an orientation of a connection line between the Bluetooth/Wi-Fi antenna array of the source device 1 and the Bluetooth/Wi-Fi antenna of the source device 2.

It should be understood that only FIG. 11 and FIG. 12 are used to describe a manner in which the source device 1 determines the distance and the position relationship between the source device 1 and the source device 2. A manner in which the source device 1 determines the distance and the position relationship between the source device 1 and the source device 2 is not specifically limited in embodiments of this application.

S1003: In response to receiving the notification information, the source device 2 sends, to the source device 1, information about an image that needs to be projected.

In an embodiment, in response to receiving the notification information, the source device 2 prompts a user whether to project content displayed by the source device 2 and the source device 1 together. In response to an operation of determining, by the user, to project the content displayed by the source device 2 and the source device 1 together, the source device 2 sends projection data corresponding to the currently displayed image information to the source device 1.

Figure 3A:
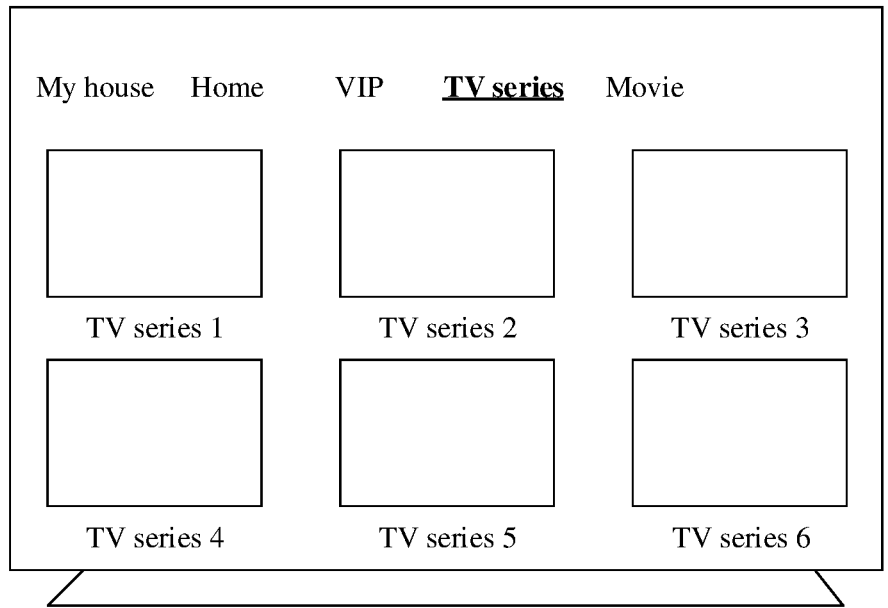
FIG. 3(a), FIG. 3(b), FIG. 3(c), FIG. 3(d), and FIG. 3(e) show a group of graphical user interfaces according to an embodiment of this application.
Figure 3A:
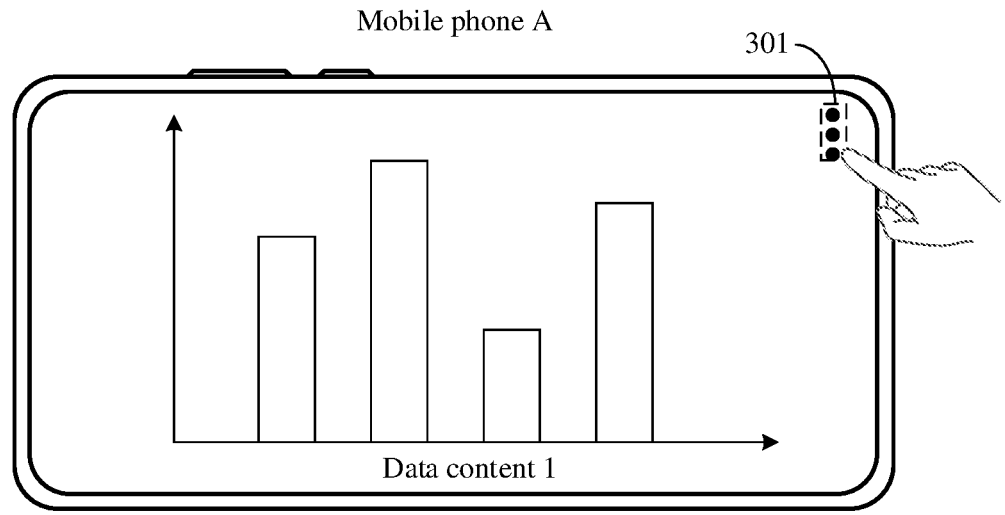
Figure 3B:
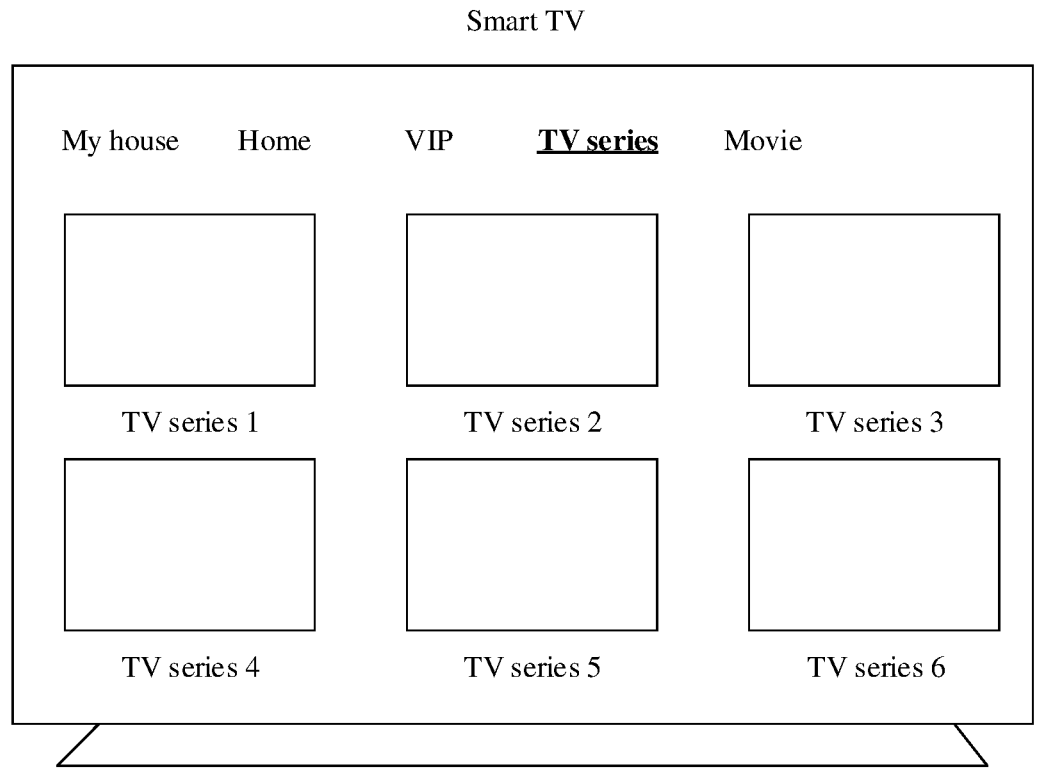
Figure 3B:
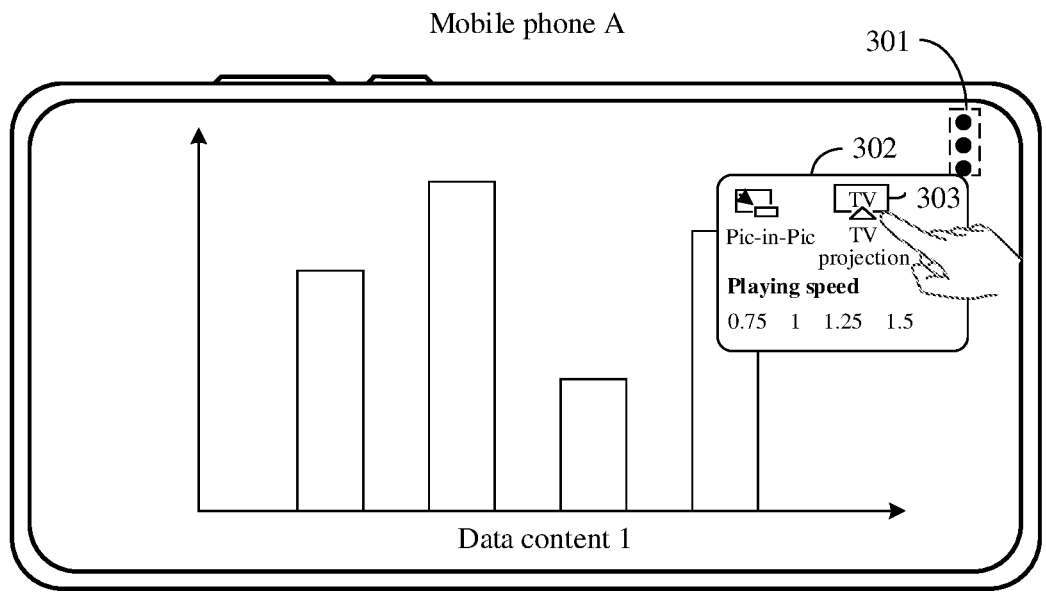
Figure 3C:
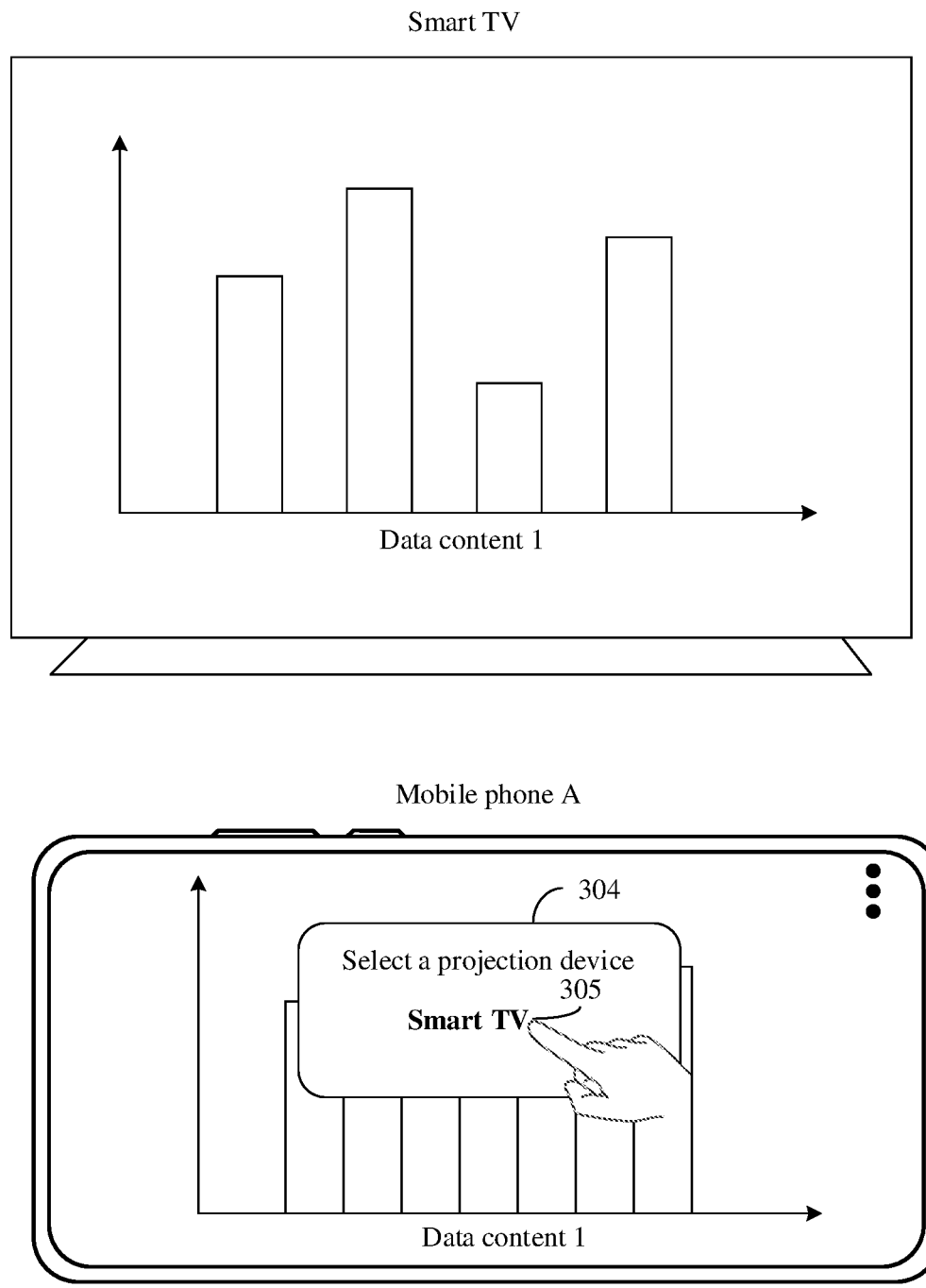
Figure 3D:
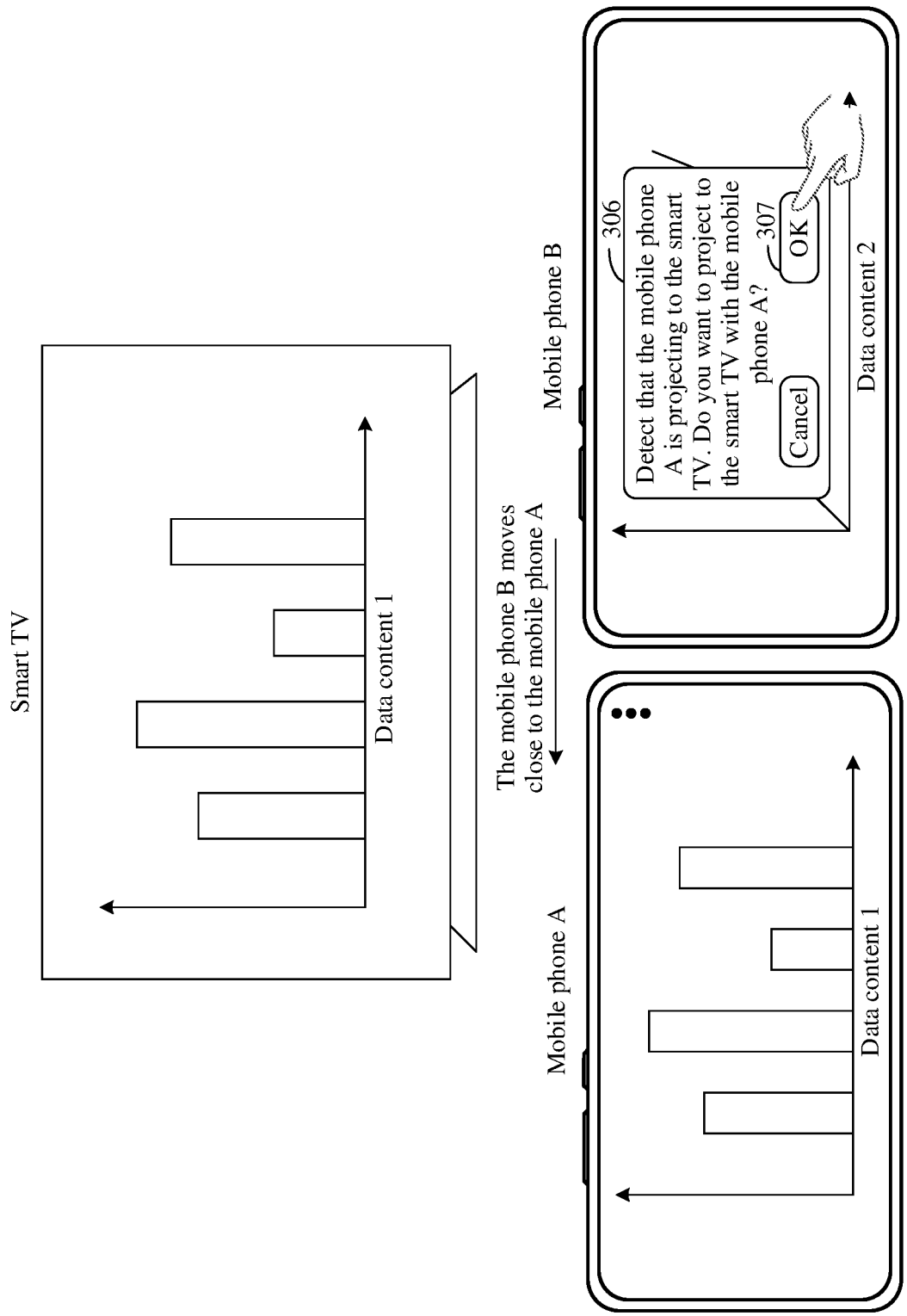

For example, as shown in FIG. 3(d), in responding to receiving the notification information of the mobile phone A, the mobile phone B prompts the user "Detect that the mobile phone A is projecting to the smart TV. Do you want to project to the smart TV with the mobile phone A?". When the mobile phone detects an operation of tapping the control 307 by the user, the mobile phone B may send, to the mobile phone A, content that needs to be projected.

For example, the source device 2 sends a UDP data packet to the source device 1, where the UDP data packet may carry the projection data. The UPD packet includes a data part of an IP datagram. The data part of the IP datagram may include extensible bits. The source device 2 may perform image encoding on the projection data by using an image encoding technology, and carry the encoded data to an extensible bit. After receiving the UDP data packet, the source device 1 may decode, by using an image decoding technology, the data carried in the extensible bit, to obtain the projection data.

For example, the source device 2 sends a TCP data packet to the source device 1, where the TCP data packet may carry projection data. The TCP data packet includes a TCP header and a TCP data part, and the projection data may be carried in the TCP data part. The source device 2 may perform image encoding on the projection data by using an image encoding technology, and carry the encoded data to an extensible bit. After receiving the TCP data packet, the source device 1 may decode, by using the image decoding technology, the data carried in the extensible bit, to obtain the projection data.

S1004: In response to receiving the image information, the source device 1 projects the projection data of the source device 1 and the received projection data of the source device 2 to the sink device based on the position relationship between the source device 1 and the source device 2.

Figure 13A:
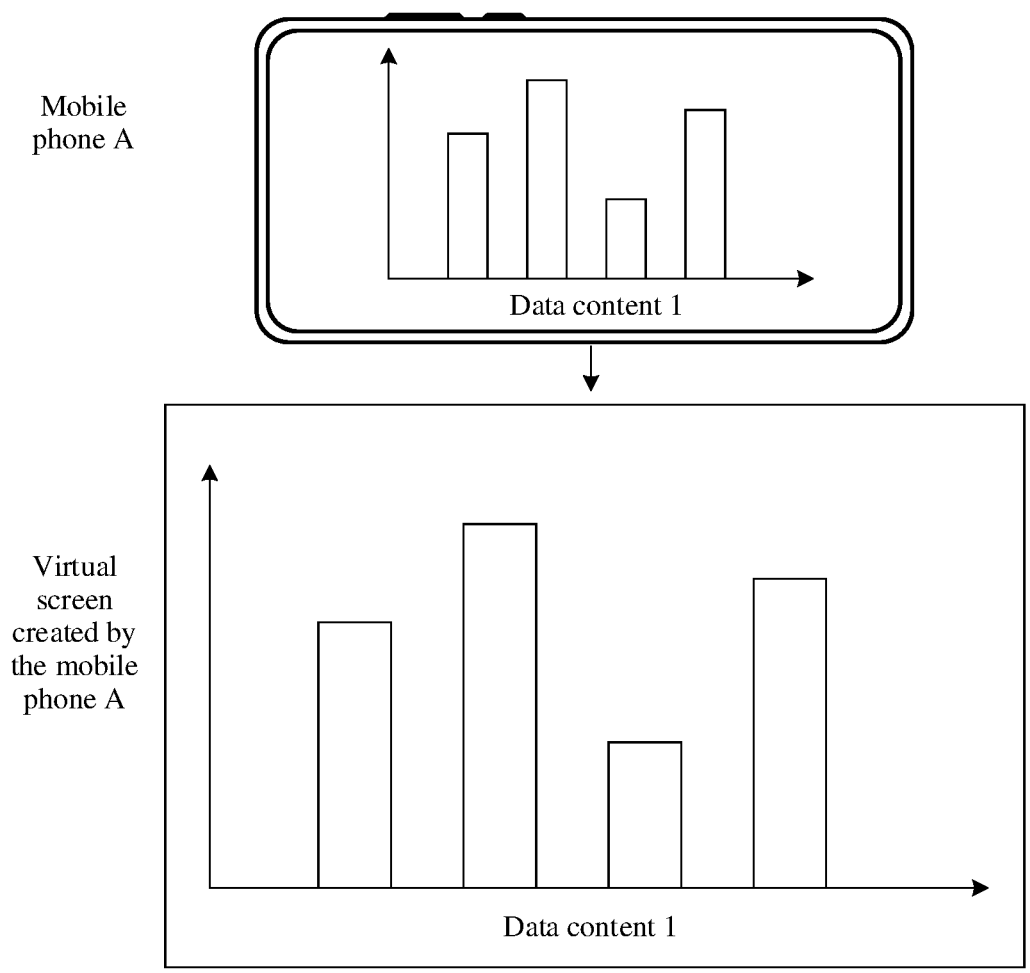
FIG. 13(a) and FIG. 13(b) each show a process in which a source device 1 creates a virtual screen and projects content on the virtual screen to a sink device according to an embodiment of this application.
Figure 13B:
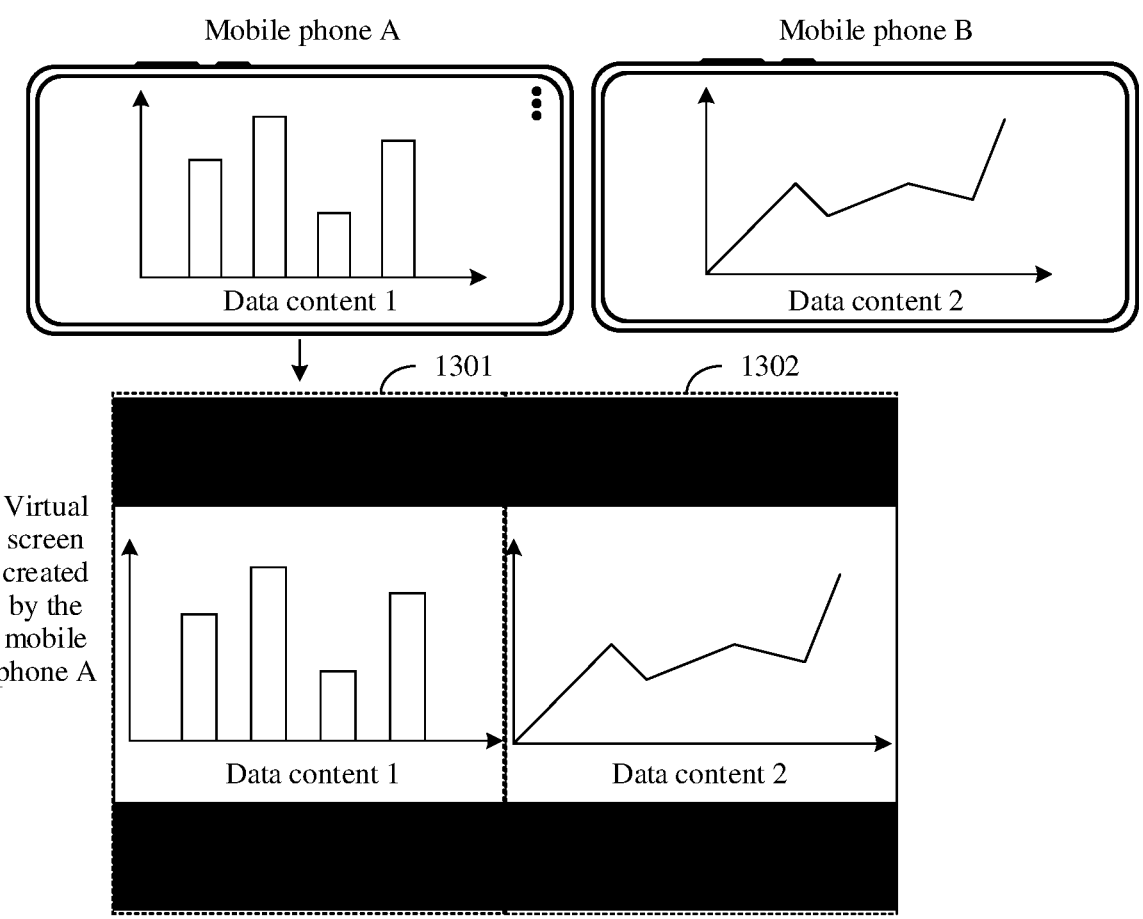

FIG. 13(a) and FIG. 13(b) each show a process in which a source device 1 creates a virtual screen and projects content on the virtual screen to a sink device. As shown in FIG. 13(a) and FIG. 13(b), when the source device 1 performs screen projection, the source device 1 may first obtain a screen size, a device size, a resolution, a pixel density, and the like of the sink device. For example, the source device is an Android device, and a method for creating a virtual screen by the source device 1 may be DisplayManager.createVirtualDisplay(String, int, int, int, Surface, int). After the source device 1 creates the virtual screen, the source device 1 may place content displayed on the current interface into the virtual screen, to project the virtual screen to the sink device.

For example, with reference to FIG. 3(c) and FIG. 13(a), a ratio of an image displayed by the mobile phone A is 16:9, and a screen resolution of the smart TV is 3840×2160. (That is, a smart TV can also display the 16:9 image ratio.) Therefore, the mobile phone A may create a virtual screen whose image ratio is 16:9 based on the screen resolution of the smart TV, and place the image displayed by the mobile phone A into the virtual screen. In this case, because the image ratio of the virtual screen is also 16:9, the image of the data content 1 displayed on the virtual screen has no black edge. When mobile phone A can project the content in the virtual screen to the smart TV, the smart TV can display the image on the entire screen without leaving a black edge.

Figure 3E:
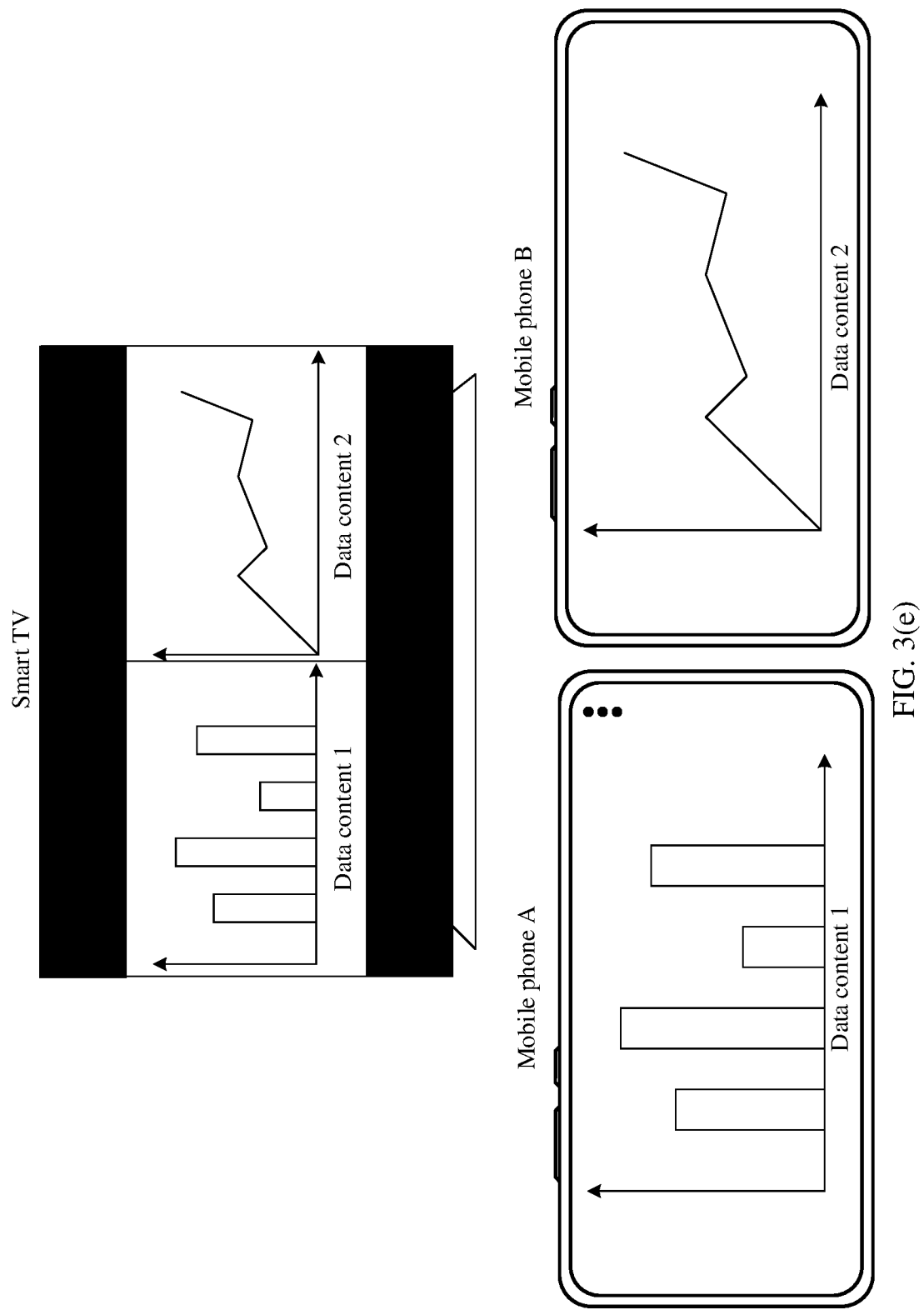

With reference to FIG. 3(e) and FIG. 13(b), after the mobile phone A receives the projection data sent by the mobile phone B, the mobile phone A may divide, based on the position relationship between the mobile phone A and the mobile phone B, the virtual screen into two areas (an area 1301 and an area 1302) of a same size. The projection data of the mobile phone A may be displayed in the left half area 1301, and the projection data of the mobile phone B may be displayed in the right half area 1302. If the image ratio of the projection data of the mobile phone B is also 16:9, the mobile phone A may place the projection data of the mobile phone A into the left half area 1301 and leave a black edge up and down. The mobile phone A may place the projection data of the mobile phone B into the right half area 1302 with a black edge up and down.

In an embodiment, when the source device 2 detects an operation of flipping the screen of the source device 2 by the user, the source device 2 may stop sending the projection data to the source device 1. If the source device 1 stops receiving the projection data sent by the source device 2, the source device 1 may send the projection data of the source device 1 to the sink device, so that the sink device displays only the projection interface of the source device 1.

In an embodiment, when the source device 1 detects an operation of flipping the screen of the source device 1 by the user, the source device 1 may stop sending the projection data of the source device 1 and the source device 2 to the sink device. In this way, the sink device stops displaying the projection interfaces of the source device 1 and the source device 2.

In an embodiment, after the source device 2 detects that the screen of the source device 2 is partially or completely covered with another object, the source device 2 may stop sending the projection data to the source device 1. For example, as shown in FIG. 9(*b*), after the mobile phone B detects that the screen is covered with another object, the mobile phone B may stop sending the projection data to the mobile phone A. After the mobile phone C moves close to the mobile phone A, the mobile phone C may be triggered to send the projection data of the data content 1 to the mobile phone A. In response to receiving the projection data of the mobile phone C, the mobile phone A may perform screen projection to the smart TV based on the position relationship between the mobile phone A and the mobile phone C.

In an embodiment, after the source device 1 detects that the screen of the source device 1 is partially or completely covered with another object, the source device 1 may stop sending the projection data to the sink device.

It should be understood that, in this embodiment of this application, for detecting, by the source device, that the screen of the source device is flipped, reference may be made to implementation in the conventional technology. For example, the source device may detect, by using a gravity sensor, whether the screen is flipped. When the source device performs screen projection, a camera may be enabled. If the source device collects image information by using the camera, whether an object covers the screen within a preset distance from the screen of the mobile phone may be determined by using the image information collected by the camera.

The foregoing describes a process in which the mobile phone A projects the projection data of the mobile phone A and the projection data of the mobile phone B to the smart TV with reference to FIG. 10 to FIG. 13(*b*). With reference to the accompanying drawings, the following describes a process in which the mobile phone B projects a screen to the smart TV after receiving the notification information sent by the mobile phone A.

Figure 14:
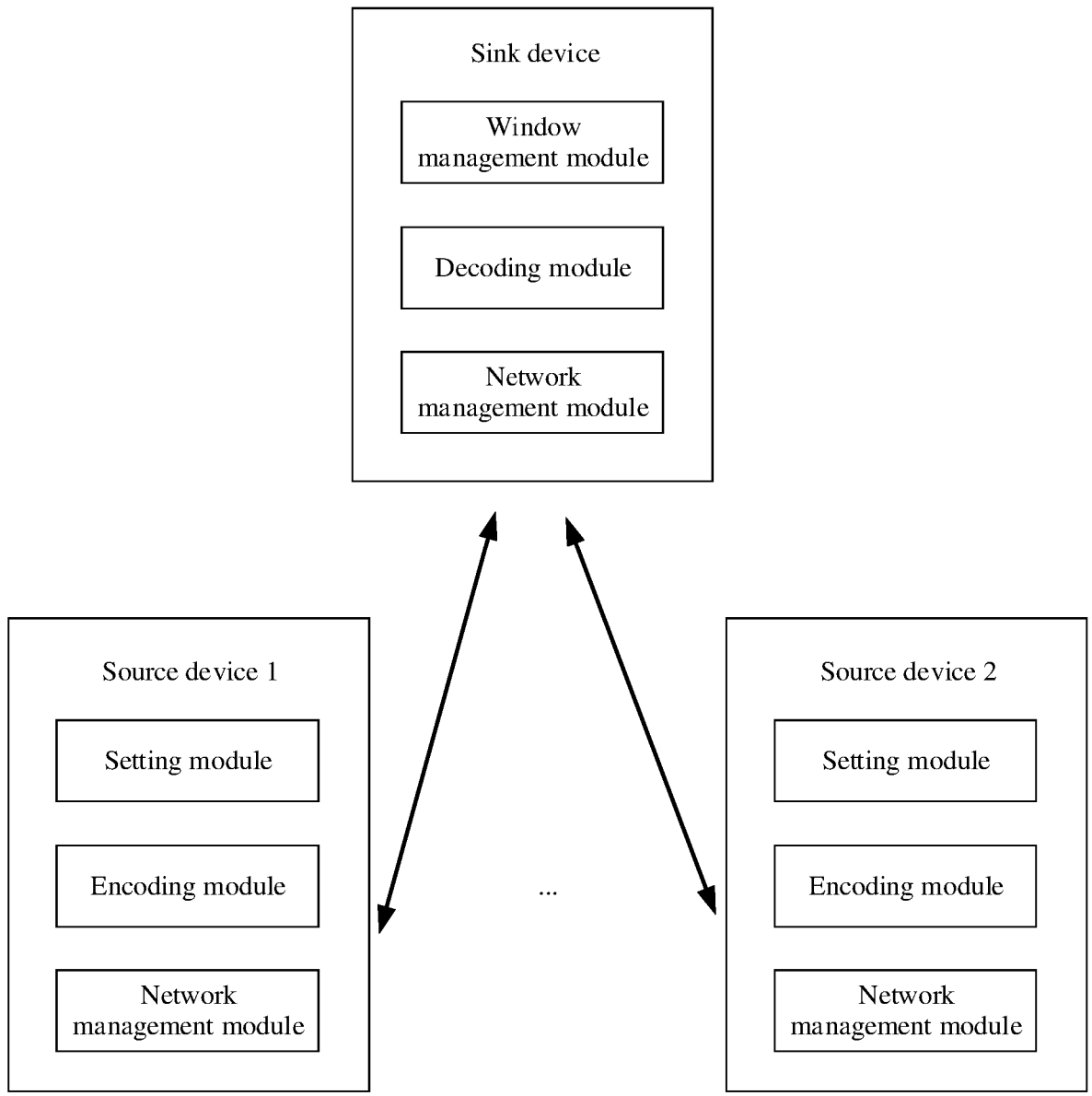
FIG. 14 shows software architectures of a source device 1, a source device 2, and a sink device according to an embodiment of this application.

FIG. 14 shows software architectures of a source device 1, a source device 2, and a sink device according to an embodiment of this application. For example, the source device 1 and the source device 2 are used as a projection source device, and the sink device is used as a projection destination device.

As shown in FIG. 14, the source device 1 may include a network management module, an encoding module, and a setting module. The modules included in the source device 1 may be included in any layer of a software architecture of the source device 1. For example, the network management module and the encoding module of the source device 1 are included in a framework layer of the source device 1. The setting module of the source device 1 is included in an application layer of the source device 1. This is not specifically limited in embodiments of this application. The source device 1 may further include an application, and may be included in the foregoing application layer. The application may include a projection application, and the projection application may assist the source device 1 used as the projection source to implement a many-to-one projection function. A software architecture of the source device 2 is similar to that of the source device 1. Details are not described herein again.

The sink device may include a network management module, a decoding module, and a window management module. The modules included in the sink device may be included in any layer of a software architecture of the sink device. For example, the network management module, the decoding module, and the window management module of the sink device are all included in the framework layer of the sink device. This is not specifically limited in embodiments of this application. The sink device may further include an application, and may be included in the foregoing application layer. The application may include a projection application, and the projection application may assist the sink device used as the projection destination to implement a many-to-one projection function.

In this embodiment, the network management module of the sink device may be responsible for establishing transmission channels between the sink device and the source device 1 and between the sink device and the source device 2. The network management module of the sink device may support establishment of transmission channels between the sink device and a plurality of devices (for example, the source device 1 and the source device 2), that is, support establishment of a one-to-N connection. The decoding module of the sink device may be responsible for decoding projection data from the source device 1 and the source device 2 that are used as the projection source. This decoding module supports multi-channel decoding. For example, for data from different devices, the decoding module of the sink device may decode corresponding data by using different decoding parameters. The window management module of the sink device may be responsible for displaying a plurality of projection windows on the sink device based on the multi-channel decoded data and a position relationship between the source device 1 and the source device 2. A position relationship of the plurality of projection windows corresponds to the position relationship between the source device 1 and the source device 2. Content in the projection window is the same as all or part of content of interfaces displayed by the corresponding source device 1 and the source device 2. The window management module of the sink device may further be responsible for dynamically increasing or decreasing a projection window on the sink device based on a screen status of the source device and an indication of the source device.

The network management module of the source device 1 may be responsible for establishing a transmission channel between the source device 1 and the sink device. The encoding module of the source device 1 may be responsible for encoding data (for example, referred to as projection data) corresponding to a current display interface or some elements on an interface. The setting module of the source device 1 may be responsible for setting an audio and video parameter based on a setting of the user. The audio and video parameter may include a resolution, a landscape/portrait orientation, a same source/different source, layer filtering, and the like. The same source/different source may indicate whether the current interface continues to be displayed on the source device 1 after the source device 1 projects a screen. The same source indicates that the current interface continues to be displayed on the source device 1 after the source device 1 projects a screen. The different source indicates that the current screen does not continue to be displayed on the source device 1 after the source device 1 projects a screen.

Figure 15:
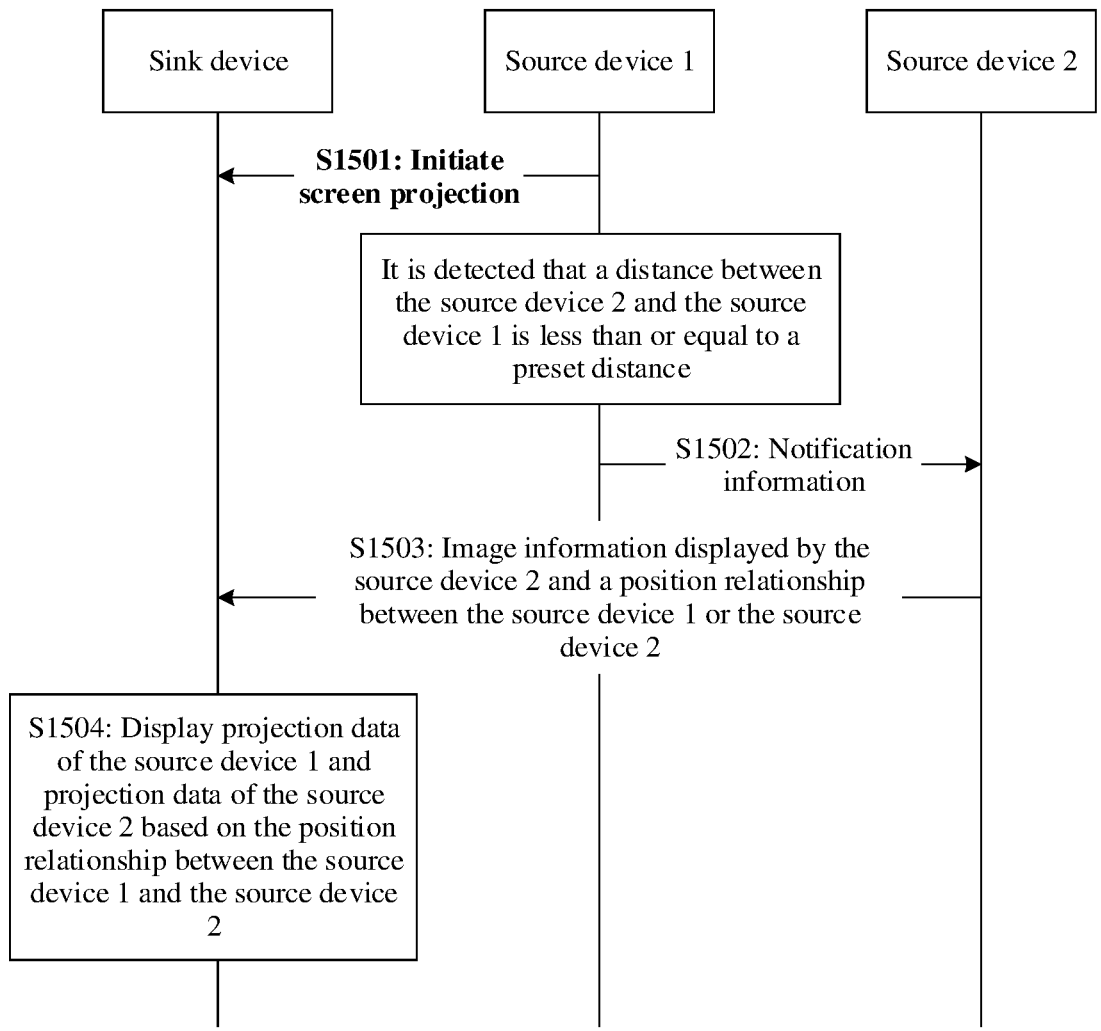
FIG. 15 is another schematic flowchart of a screen projection method according to an embodiment of this application.

FIG. 15 is a schematic flowchart of a screen projection method 1500 according to an embodiment of this application. The method may be performed by a source device 1, a source device 2, and a sink device. The source device 1 and the source device 2 may be a projection source. The sink device can be a projection destination. As shown in FIG. 15, the method 1500 includes the following steps:

S1501: The source device 1 initiates screen projection to the sink device.

For example, in a process in which the source device 1 initiates screen projection to the sink device in S1101, the source device 1 and the sink device may exchange connection information (for example, an IP address) and establish a connection. After the connection between the source device 1 and the sink device is established, the source device 1 initiates video projection to the sink device.

S1502: When the source device 1 detects that a distance between the source device 1 and the source device 2 is less than or equal to a preset distance, the source device 1 sends notification information to the source device 2, where the notification information indicates that the source device 1 is performing screen projection, or the source device 1 is currently in a projection state.

It should be understood that for a process of S1501 and S1502, reference may be made to the process of S1001 and S1002. Details are not described herein again.

S1503: In response to receiving the notification information, the source device 2 sends projection data of the source device 2 and a position relationship of the source device 1 or the source device 2 to the sink device.

In an embodiment, before the source device 2 sends the projection data of the source device 2 and the position relationship of the source device 1 or the source device 2 to the sink device, the sink device may obtain connection information of the source device 2.

In an embodiment, in response to receiving the notification information, the source device 2 may prompt a user whether to project projection data of the source device 2 and the source device 1 together. In response to an operation of determining, by the user, to project the content displayed by the source device 2 and the source device 1 together, the source device 2 sends connection information of the source device 2 to the source device 1. Therefore, the source device 1 may send the connection information of the source device 2 to the sink device.

In an embodiment, in response to the operation of projecting, by the user, the projection data of the source device 2 and the source device 1 together, the source device 2 sends a BLE data packet to the source device 1, where the BLE data packet includes an extensible bit. The source device 2 may encode the connection information (for example, an IP address) of the source device 2 in an encoding manner like GBK, ISO8859-1, or Unicode (for example, UTF-8, UTF-16), and carry the encoded data in one or more extensible bits. After receiving the BLE data packet sent by the source device 2, the source device 1 may decode information on a corresponding bit, to obtain the connection information of the source device 2. It should be understood that, for a process in which the source device 1 sends the connection information of the source device 2 to the sink device, reference may be made to a process in which the source device 2 sends the connection information of the source device 2 to the source device 1. Details are not described herein again.

After obtaining the connection information of the source device 2, the sink device may establish a connection to the source device 2 based on the obtained connection information of the source device 2. Wireless communication protocols used by the sink device to establish connections to the source device 1 and the source device 2 may be the same or different. This is not specifically limited in embodiments of this application. For example, the sink device may establish a connection to the source device 1 by using a Wi-Fi protocol based on an IP address 192.168.43.164 of the source device 1, and establish a connection to the source device 2 by using the Wi-Fi protocol based on an IP address 192.168.43.155 of the source device 2. For another example, the sink device may establish the connection to the source device 1 by using the Wi-Fi protocol based on the IP address 192.168.43.164 of the source device 1, and establish the connection to the source device 2 by using a Bluetooth protocol based on the IP address 192.168.43.155 of the source device 2.

In an embodiment, with reference to FIG. 15, the process of establishing the connections between the sink device and the source device 1 and between the sink device and the source device 2 may be as follows: A network management module of the sink device initiates a network connection, for example, sends a connection establishment request, to the source device 1 and the source device 2 based on the IP address. In response to the connection establishment request, network management modules of the source device 1 and the source device 2 complete the establishment of the connection to the TV.

In an embodiment, in a process in which the source device 1 initiates screen projection to the sink device, if the sink device receives the connection information of the source device 2 that is sent by the source device 1, the sink device may learn that the source device 1 and the source device 2 want to perform many-to-one projection. After the connection between the sink device and the source device 2 is established, the sink device can receive the projection data of the source device 2.

In an embodiment, the notification information may further include connection information of the sink device.

In an embodiment, in response to receiving the notification information, the source device 2 may prompt a user whether to project projection data of the source device 2 and the source device 1 together. In response to the operation of determining, by the user, to project the content displayed by the source device 2 and the source device 1, the source device 2 may establish a connection to the sink device based on the connection information carried in the notification information.

It should be understood that, for a specific implementation process in which the source device adds the connection information of the sink device to the notification information, reference may be made to the description in the foregoing embodiments. Details are not described herein again. After the sink device establishes a connection to the source device 2, the source device 2 may send corresponding projection data and the position relationship between the source device 1 and the source device 2 to the sink device.

It should be understood that, for a process in which the source device 2 may send the corresponding projection data to the sink device, reference may be made to the foregoing process in which the source device 2 sends the projection data to the source device 1. Details are not described herein again.

It should be further understood that, for a process in which the source device 2 determines the position relationship between the source device 2 and the source device 1, reference may be made to the process shown in FIG. 12. Details are not described herein again.

The following describes several manners in which the source device 2 sends the position relationship between the source device 2 and the source device 1 to the sink device.

For example, the source device 2 may send a BLE data packet to the sink device, where the BLE data packet includes an extensible bit. The source device 2 and the sink device may agree on content of some fields (a first field, a second field, and a third field) in the extensible bit. The first field indicates a position relationship between the source device 2 and another device (for example, the source device 1). For example, if the first field is "01", it indicates that the source device 2 and the source device 1 are arranged left and right. The second field indicates address information (for example, an IP address) of a device located at a left side (for example, the source device 1). The third field identifies address information (for example, an IP address) of a device located at a right side (for example, the source device 2). The source device 2 may separately encode the address information of the source device 1 and the source device 2 in an encoding manner like GBK, ISO8859-1, or Unicode (for example, UTF-8, UTF-16), and carry the encoded data in the second field and the third field.

If the first field is "10", it indicates that the source device 2 and the source device 1 are arranged up and down. In this case, the second field indicates address information (for example, an IP address) of a device located at an upper side (for example, the source device 1). The third field identifies address information (for example, an IP address) of a device located at a lower side (for example, the source device 2).

After the sink device receives the BLE data packet, the sink device may learn of the position relationship between the source device 2 and the another device by using the content carried in the first field. For example, if the first field is "01", the sink device may learn that the source device 2 and the another device are arranged left and right. Further, the sink device may decode the content carried in the second field and the third field, to obtain the address information of the device located at the left side and the address information of the device located at the right side.

In an embodiment, if a source device 3 moves close to the source device 1 and the source 2, the source device 3 may first establish a connection to the sink device. After the connection is established, the source device 3 may send a position relationship among the source device 1, the source device 2, and the source 3 to the sink device. A distribution manner shown in FIG. 6(*a*) is used as an example. After the mobile phone C moves close to the mobile phone A, the mobile phone C may determine that the mobile phone A is located at the upper side of the mobile phone C, and the mobile phone B is located at an upper-right side of the mobile phone C. In this case, the mobile phone C may separately add the position relationship between the mobile phone C and the mobile phone A and information about the position between the mobile phone C and the mobile phone B to the BLE data packet sent to the smart TV. For example, the mobile phone C may carry the first field to a sixth field in the extensible field. The first field indicates the position relationship between the mobile phone C and the mobile phone A. For example, when the first field is "10", it indicates that the mobile phone A and the mobile phone C are arranged up and down. A second field may carry address information of the mobile phone A located at the upper side. A third field may carry address information of the mobile phone C located at the lower side. A fourth field may indicate the position relationship between the mobile phone C and the mobile phone B. For example, when the fourth field is "11", it indicates that the mobile phone C and the mobile phone B are arranged in a lower-left direction and an upper-right direction. A fifth field may carry address information of the mobile phone C located at a lower-left side. The sixth field may carry position information of the mobile phone B located at an upper-right side. Therefore, after receiving the BLE data packet, the smart TV determines the position relationship between the mobile phone C and the mobile phone A by using the first field to the third field, and determines the position relationship between the mobile phone C and the mobile phone B by using the fourth field to the sixth field.

It should be understood that the foregoing S1503 is described by using an example in which the source device 2 indicates the position relationship between the source device 2 and the source device 1 to the sink device. In embodiments of this application, the source device 1 may indicate the position relationship between the source device 2 and the source device 1 to the sink device. For a specific implementation process, refer to the description of the foregoing embodiments. Details are not described herein again.

In an embodiment, the sink device separately creates corresponding views for the source device 1 and the source device 2 based on the position relationship between the source device 1 and the source device 2.

It may be understood that, when the source device 1 and the source device 2 are separately connected to the sink device, the source device 1 and the source device 2 that serve as the projection source may project interfaces displayed on displays of the source device 1 and the source device 2 to display on the display of the sink device that serves as the projection destination, so as to implement many-to-one projection. To achieve a many-to-one projection purpose, in this embodiment, the sink device used as the projection destination may perform the following preparations.

For the source device 1 and the source device 2, after obtaining the connection information of the source device 1 and the source device 2, or after successfully connecting to the source device 1 and the source device 2, the sink device may create the corresponding views (view), used to render the interfaces projected by the source device 1 and the source device 2.

For example, after the sink device obtains the IP addresses of the source device 1 and the source device 2, or successfully connects to the source device 1 and the source device 2, the sink device may locally store an array, for example, referred to as an array 1. The array 1 includes IP addresses of the source device 1 and the source device 2 that are used as the projection source. The sink device may create, based on the array 1, a corresponding view for each of the source device 1 and the source device 2 that are used as the projection source, to render the interfaces projected by the source device 1 and the source device 2. For example, a window management module of the sink device creates a view array, where the view array may include views in a one-to-one correspondence with the IP addresses in the array 1.

The sink device configures decoding parameters for the source device 1 and the source device 2, and is used to decode the projection data from the source device 1 and the source device 2.

It may be understood that a specific implementation in which the projection source projects the current display interface to the projection destination may be that the projection source obtains data corresponding to the current display interface, for example, referred to as projection data, and sends the data to the projection destination, so that the projection destination displays corresponding content on the display of the projection destination. Generally, before the projection source transmits the projection data, the projection data may be encoded, and the encoded projection data is transmitted to the projection destination. Correspondingly, after receiving the projection data from the projection source, the projection destination may decode the projection data.

In embodiments of this application, for the source device 1 and the source device 2 that are used as the projection source, the sink device may decode the projection data from different devices by using a same decoding parameter, or may decode the projection data from different devices by using different decoding parameters. In a scenario in which the different decoding parameters are used to decode the projection data from the different devices, after the window management module of the sink device successfully creates a view corresponding to each IP address, the window management module of the sink device may configure, in the decoding module of the sink device, a decoding parameter associated with the corresponding IP address. For example, after the view is successfully created, the window management module of the sink device may configure, in the decoding module by using a callback function, the decoding parameter associated with the corresponding IP address. In this way, the sink device may configure different decoding parameters for the source device 1 and the source device 2, to decode the projection data from the source device 1 and the source device 2. The foregoing decoding parameters may be negotiated by the sink device, the source device 1, and the source device 2, or may be preconfigured on the sink device. This is not specifically limited in embodiments of this application.

In an example, the decoding parameter may include an allocation mode of a video stream, a specification of the video stream, a video encoding format, a bit rate of video encoding, a virtual display flag, whether to project audio data, and the like. The allocation mode of the video stream may include a broadcast mode, a distribution mode, an aggregation mode, and the like. The broadcast mode may mean that only a single video stream is started and distributed to a plurality of projection destinations with a low delay. The distribution mode may indicate that a plurality of video streams are started and respectively distributed to a plurality of different projection destinations. The aggregation mode may indicate that a plurality of video streams are started and distributed to a same projection destination. The specifications of the video stream may refer to resolution of a video encoder, for example, 720p, 1080p, or 2K. The video encoding format may be H.264 (advanced video coding (AVC)), H.265 (high Efficiency video coding (HEVC)), or the like.

S1504: The sink device displays the projection data of the source device 1 and the projection data of the source device 2 based on the position relationship between the source device 1 and the source device 2.

In an embodiment, the sink device draws a projection interface 1 and a projection interface 2 based on the position relationship between the source device 1 and the source device 2 by using the created corresponding views, and displays the projection interface 1 and the projection interface 2 on the sink device.

In an embodiment, a specific implementation of projecting, by the source device 1 and the source device 2 to the display of the sink device, the interfaces displayed on the displays of the source device 1 and the source device 2 may be: The source device 1 and the source device 2 obtain the data corresponding to the current display interfaces of the source device 1 and the source device 2, for example, projection data, and send the data to the sink device, so that the sink device displays corresponding content on the display of the sink device. In this way, the display interfaces of the source device 1 and the source device 2 are projected and displayed on the display of the sink device.

In some embodiments, a distributed multimedia protocol (DMP) may be used to implement projection display from the display interfaces of the source device 1 and the source device 2 to the display of the sink device. For example, the source device 1 and the source device 2 may create virtual screens by using a display management module of a second terminal. Then, the source device 1 and the source device 2 may move drawings of the interfaces displayed on the displays to the virtual screen. In this way, the source device 1 and the source device 2 can obtain corresponding projection data. Then, the source device 1 and the source device 2 may send the obtained projection data to the sink device. For example, with reference to FIG. 15, after the source device 1 and the source device 2 obtain the projection data, an encoding module of the source device 1 may encode the projection data and send the encoded data to a network management module of the source device 1. The network management module of the source device 1 may send the encoded projection data to the sink device by using the connection established with the sink device. For a process in which the source device 2 sends the encoded projection data to the sink device, refer to the foregoing description. Details are not described herein again.

In some other embodiments, wireless projection (Miracast) may alternatively be used to implement projection display of the display interfaces of the source device 1 and the source device 2 on the displays of the sink device. In other words, the source device 1 and the source device 2 each may display all layers of the interfaces, and then integrate all the obtained layers into a video stream (or projection data). Then, encoding modules of the source device 1 and the source device 2 each may encode the video stream and send the encoded video stream to the network management module, so that the network management module sends the encoded video stream to the sink device according to a real time streaming protocol (real time streaming protocol, RTSP) by using the connection established with the sink device.

In the foregoing embodiments, an example in which all content on the display interface on the display of the second terminal is projected to the display of the first terminal for display is used for description. In some other embodiments, a part of content on the display interface, for example, some elements on the interface, on the display of the second terminal may be alternatively projected to the display of the first terminal for display. The element that needs to be projected to the first terminal may be a predetermined element on the interface, for example, a video element. When the second terminal performs projection, only a layer at which the predetermined element is located may be projected to the first terminal, and another layer is not projected. In this way, privacy information on the second terminal can be protected from being displayed on the first terminal.

Whether the second terminal projects only the layer at which the predetermined element is located may be predefined by a system. For example, when the interface displayed on the display of the second terminal includes the predetermined element, the second terminal projects only the layer at which the predetermined element is located to the first terminal. When the interface displayed on the display of the second terminal does not include the predetermined element, the second terminal projects all the content on the current interface to the first terminal.

In an embodiment, when a source device (for example, the source device 1) is currently playing a sound, for example, when a user uses the source device 1 to watch a video or listen to music, after the source device 1 enables projection, the source device 1 may not only project a currently displayed interface to the sink device, but also project an audio to the sink device. In this scenario, the projection data of the source device 1 may include video data and audio data. The video data is used by the sink device to display a corresponding projection interface on the display of the sink device, and the audio data is used by the sink device to play a corresponding sound. A specific process of obtaining the video data is the same as the process described in the foregoing embodiments in which projection is implemented by using the DMP or a wireless projection manner. A process of obtaining the audio data may be as follows: The source device 1 may pre-create an audio record (AudioRecord) object, and create a buffer. The AudioRecord object can be invoked by the source device 1. After the AudioRecord object is invoked, the audio data in the source device 1 may be recorded. For example, if the projection interface includes a video component, audio in the video played on the video component may be recorded, to obtain the audio data, and the audio data is stored in the created buffer. Then, the source device 1 may obtain the audio data from the buffer, and send the audio data to the sink device. It should be noted that, in this scenario, both video data and the audio data may be projected to the sink device, or only the video data may be projected to the sink device, but the audio data is not projected to the sink device.

After receiving the projection data from the source device 1 and the source device 2, the sink device may display, on the display of the sink device based on the received projection data, the projection interfaces corresponding to the position relationship between the source device 1 and the source device 2.

As shown in FIG. 3(*e*), after receiving the position relationship that is between the mobile phone A and the mobile phone B and that is sent by the mobile phone B, the smart TV may determine that the mobile phone A is located at a left side of the mobile phone B, or the mobile phone B is located at a right side of the mobile phone A. After receiving the projection data 1 corresponding to the data content 1, the smart TV may display a projection interface, for example, referred to as a projection interface 1, on the smart TV based on the projection data 1. The projection interface 1 may be located in a left half area of the display. Content displayed on the projection interface 1 is the same as all or part of content of the display interface on the display of the mobile phone A, or content on the projection interface 1 is a mirror image of all or part of content of the display interface on the display of the mobile phone A.

Similarly, after receiving the projection data 2 corresponding to the data content 2, the smart TV may display a projection interface, for example, referred to as a projection interface 2, on the TV based on the projection data 2. The projection interface 2 may be located in a right half area of the display of the smart TV. Content displayed on the projection interface 2 is the same as all or a part of content of the display interface on the display of the mobile phone B, or content on the projection interface 2 is a mirror image of all or a part of content of the display interface on the display of the mobile phone B.

In an embodiment, specific implementation of correspondingly displaying, by the sink device, the projection interfaces on the sink device based on the received projection data of the source device 1 and the source device 2 may be: After receiving the projection data from the source device 1 and the source device 2, the network management module of the sink device may send the projection data to the decoding module of the sink device for decoding. The decoding module of the sink device decodes the projection data by using the corresponding decoding parameter, and then sends the projection data to the window management module of the sink device. The window management module of the sink device may draw and display corresponding projection interfaces on the display of the sink device based on the received projection data and the position relationship between the source device 1 and the source device 2.

In an embodiment, when the source device 2 detects an operation of flipping the screen of the source device 2 by the user, the source device 2 may stop sending the projection data to the sink device. If the sink device receives the projection data of the source device 1 but does not receive the projection data sent by the source device 2, the sink device may display only the projection interface of the source device 1.

In an embodiment, when the source device 1 detects an operation of flipping the screen of the source device 1 by the user, the source device 1 may stop sending the projection data of the source device 1 to the sink device. If the sink device receives the projection data of the source device 2 but does not receive the projection data sent by the source device 1, the sink device may display only the projection interface of the source device 2.

In an embodiment, after the source device 2 detects that the screen of the source device 2 is partially or completely covered with another object, the source device 2 may stop sending projection data to the sink device. If the sink device receives the projection data of the source device 1 but does not receive the projection data sent by the source device 2, the sink device may display only the projection interface of the source device 1.

In an embodiment, after the source device 1 detects that the screen of the source device 1 is partially or completely covered with another object, the source device 1 may stop sending the projection data to the sink device. If the sink device receives the projection data of the source device 2 but does not receive the projection data sent by the source device 1, the sink device may display only the projection interface of the source device 2.

Figure 16:
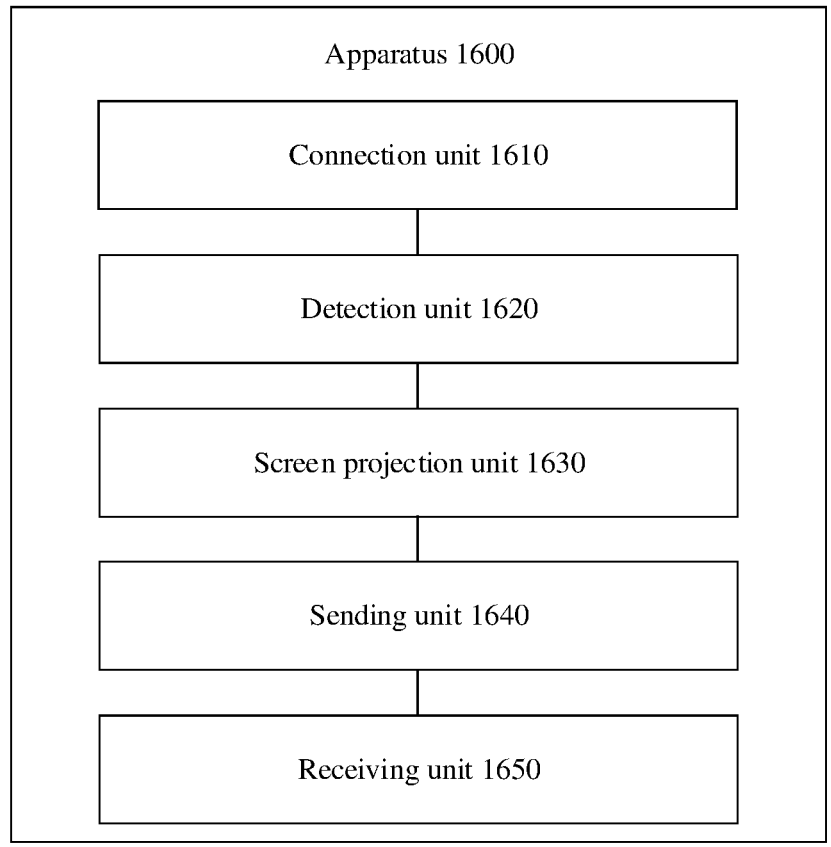
FIG. 16 is a schematic diagram of a structure of an apparatus according to an embodiment of this application.

FIG. 16 is a schematic block diagram of an apparatus 1600 according to an embodiment of this application. The apparatus 1600 may be disposed in the source device 1 in FIG. 10. The apparatus 1600 includes a connection unit 1610, configured to establish a connection to a first electronic device; a detection unit 1620, configured to detect an operation of a user; a screen projection unit 1630, configured to project first projection data to the first electronic device in response to detecting the operation, where the detection unit 1620 is further configured to detect that a distance between the third electronic device and the apparatus is less than or equal to a preset distance; a sending unit 1640, configured to send notification information to the third electronic device, where the notification information indicates that the apparatus is performing screen projection; and a receiving unit 1650, configured to receive second projection data sent by the third electronic device, where the screen projection unit 1630 is further configured to project the first projection data and the second projection data to the first electronic device based on orientation information between the apparatus and the third electronic device.

Figure 17:
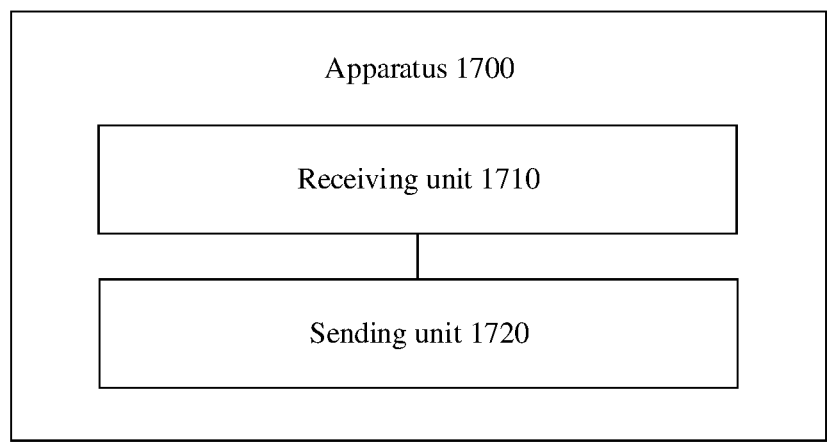
FIG. 17 is a schematic diagram of a structure of an apparatus according to an embodiment of this application.

FIG. 17 is a schematic block diagram of an apparatus 1700 according to an embodiment of this application. The apparatus 1700 may be disposed in the source device 2 in FIG. 10. The apparatus 1700 includes: a receiving unit 1710, configured to: when a distance between the apparatus and a second electronic device is less than or equal to a preset distance, receive notification information sent by the second electronic device, where the notification information indicates that the second electronic device is performing screen projection; and a sending unit 1720, configured to send second projection data to the second electronic device.

Figure 18:
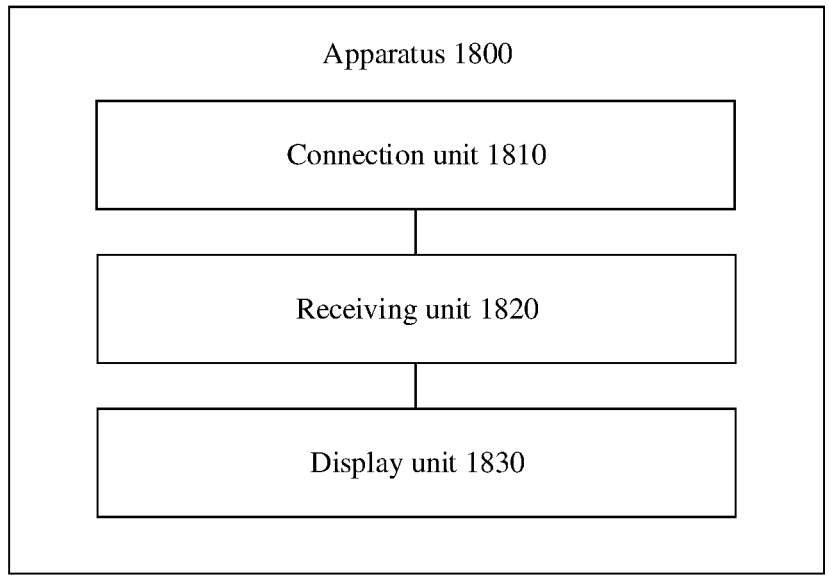
FIG. 18 is a schematic diagram of a structure of an apparatus according to an embodiment of this application.

FIG. 18 is a schematic block diagram of an apparatus 1800 according to an embodiment of this application. The apparatus 1800 may be disposed in the sink device in FIG. 15. The apparatus 1800 includes a connection unit 1810, configured to establish a connection to a second electronic device; a receiving unit 1820, configured to receive first projection data sent by the second electronic device; and a display unit 1830, configured to display the first projection data, where the connection unit 1810 is further configured to establish a connection to a third electronic device, the receiving unit 1820 is further configured to: receive second projection data sent by the third electronic device, and obtain orientation information between the second electronic device and the third electronic device, and the display unit 1830 is further configured to display the first projection data and the second projection data based on the orientation information.

Figure 19:
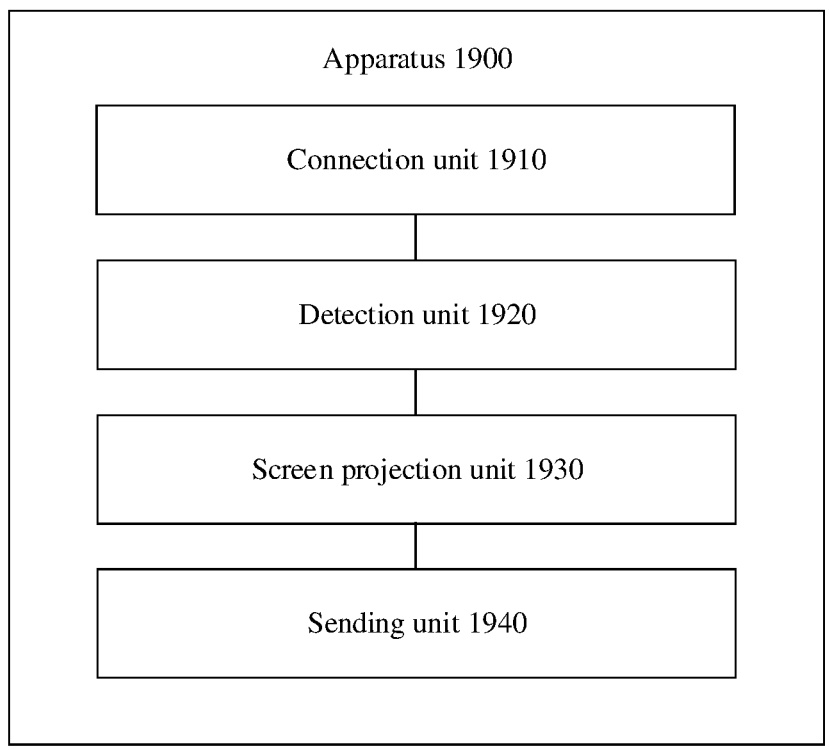
FIG. 19 is a schematic diagram of a structure of an apparatus according to an embodiment of this application.

FIG. 19 is a schematic block diagram of an apparatus 1900 according to an embodiment of this application. The apparatus 1900 may be disposed in the source device 1 in FIG. 15. The apparatus 1900 includes a connection unit 1910, configured to establish a connection to a first electronic device, a detection unit 1920, configured to detect an operation of a user; a screen projection unit 1930, configured to project first projection data to the first electronic device, where the detection unit 1920, configured to detect that a distance between a third electronic device and the apparatus is less than or equal to a preset distance; and a sending unit 1940, configured to send notification information to the third electronic device, where the notification information indicates that the apparatus is performing screen projection, so that the third electronic device sends projection data to the first electronic device after receiving the notification information.

Figure 20:
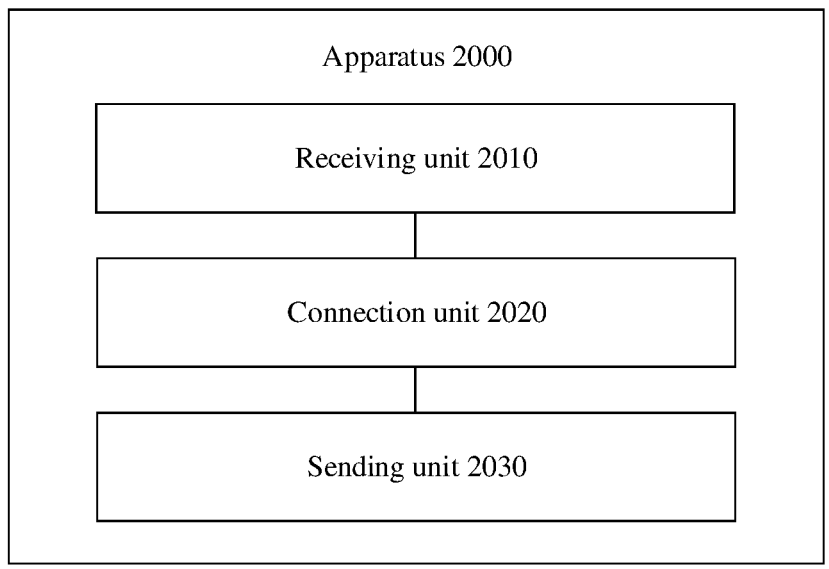
FIG. 20 is a schematic diagram of a structure of an apparatus according to an embodiment of this application.

FIG. 20 is a schematic block diagram of an apparatus 2000 according to an embodiment of this application. The apparatus 2000 may be disposed in the source device 2 in FIG. 15. The apparatus 2000 includes: a receiving unit 2010, configured to: when a distance between the apparatus and a second electronic device is less than or equal to a preset distance, receive notification information sent by the second electronic device, where the notification information indicates that the second electronic device is performing screen projection, and the first electronic device is a projection destination device of the second electronic device; a connection unit 2020, configured to establish a connection to the first electronic device; and a sending unit 2030, configured to send second projection data to the first electronic device by using the connection.

Figure 21:
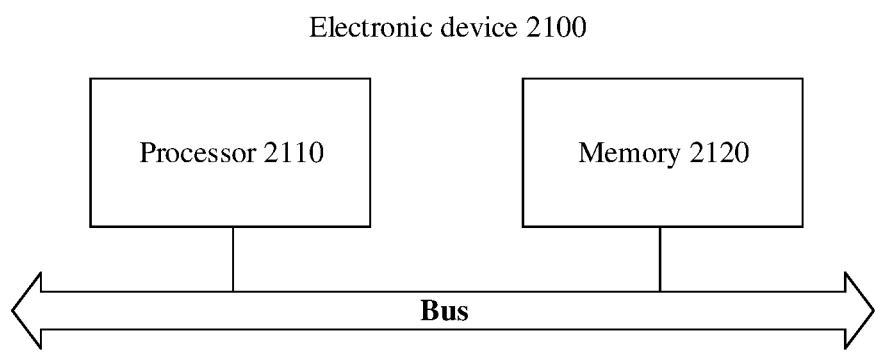
FIG. 21 is a schematic diagram of another structure of an electronic device according to an embodiment of this application.

FIG. 21 is a schematic diagram of a structure of an electronic device 2100 according to an embodiment of this application. As shown in FIG. 21, the electronic device includes one or more processors 2110 and one or more memories 2120. The one or more memories 2120 store one or more computer programs, and the one or more computer programs include instructions. When the instructions are run by the one or more processors 2110, the sink device, the source device 1, or the source device 2 is enabled to perform the technical solution in the foregoing embodiments.

An embodiment of this application provides a system, including a sink device, a source device 1, and a source device 2. The system is configured to perform the technical solutions in the foregoing embodiments. Implementation principles and technical effects thereof are similar to those of the foregoing method embodiments. Details are not described herein again.

An embodiment of this application provides a computer program product. When the computer program product runs on a source device 1 and a source device 2, the source device 1 and the source device 2 are enabled to perform the technical solutions in the foregoing embodiments. Implementation principles and technical effects thereof are similar to those of the foregoing method embodiments. Details are not described herein again.

An embodiment of this application provides a computer program product. When the computer program product is run on a sink device, the sink device is enabled to perform the technical solutions in the foregoing embodiments. Implementation principles and technical effects thereof are similar to those of the foregoing method embodiments. Details are not described herein again.

An embodiment of this application provides a readable storage medium, where the readable storage medium includes instructions. When the instructions are run on a source device 1 and a source device 2, the source device 1 and the source device 2 are enabled to perform the technical solution in the foregoing embodiments. Implementation principles and technical effects thereof are similar. Details are not described herein again.

An embodiment of this application provides a readable storage medium. The readable storage medium includes instructions. When the instructions are on a sink device, the sink device is enabled to perform the technical solutions in the foregoing embodiments. Implementation principles and technical effects thereof are similar. Details are not described herein again.

An embodiment of this application provides a chip. The chip is configured to execute instructions. When the chip runs, the technical solutions in the foregoing embodiments are executed. Implementation principles and technical effects thereof are similar. Details are not described herein again.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, like a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system comprising:
   a first electronic device;
   a second electronic device, the first electronic device being configured to establish a connection to the second electronic device, the second electronic device being configured to project first projection data to the first electronic device in response to detecting an operation of a user; and
   a third electronic device,
   the second electronic device being further configured to send notification information to the third electronic device when a distance between the third electronic device and the second electronic device is less than or equal to a preset distance the notification information indicating that the second electronic device is performing screen projection;
   the third electronic device is configured to send second projection data to the second electronic device in response to receiving the notification information; and
   the second electronic device is further configured to, in response to receiving the second projection data, project the first projection data and the second projection data to the first electronic device based on orientation information between the second electronic device and the third electronic device.

2. The system according to claim 1, wherein the third electronic device is configured to:
   in response to receiving the notification information, prompt the user to perform screen projection on the third electronic device and the second electronic device together; and
   send the second projection data to the second electronic device in response to detecting an operation that the user determines to perform screen projection on the third electronic device and the second electronic device together.

3. The system according to claim 1, wherein the third electronic device is further configured to stop, in response to detecting an operation of flipping the third electronic device by the user, sending the second projection data to the second electronic device; and
   the second electronic device is further configured to:
   when the second projection data is not received, project the first projection data to the first electronic device.

4. The system according to claim 1, wherein the third electronic device is further configured to stop, in response to detecting that a screen of the third electronic device is partially or completely covered with another object, sending the second projection data to the second electronic device; and
   the second electronic device is further configured to:
   when the second projection data is not received, project the first projection data to the first electronic device.

5. The system according to claim 4, wherein the another object is a fourth electronic device;
   the second electronic device is further configured to:
   when a distance between the fourth electronic device and the second electronic device is less than or equal to the preset distance, send the notification information to the fourth electronic device, wherein the notification information indicates that the second electronic device is performing screen projection;
   the fourth electronic device is configured to send third projection data to the second electronic device in response to receiving the notification information; and
   the second electronic device is further configured to, in response to receiving the third projection data, project the first projection data and the third projection data to the first electronic device based on orientation information between the second electronic device and the fourth electronic device.

6. A screen projection method comprising:
   establishing, by a second electronic device, a connection to a first electronic device;
   projecting, by the second electronic device, first projection data to the first electronic device in response to detecting an operation of a user;
   in response to determining that a distance between a third electronic device and the second electronic device is less than or equal to a preset distance, sending, by the second electronic device, notification information to the third electronic device, wherein the notification information indicates that the second electronic device is performing screen projection;
   receiving, by the second electronic device, second projection data sent by the third electronic device; and in response to receiving the second projection data, projecting, by the second electronic device, the first projection data and the second projection data to the first electronic device based on orientation information between the second electronic device and the third electronic device.

7. The method according to claim 6, wherein the method further comprising:
in response to detecting an operation of flipping a screen of the second electronic device by the user, projecting, by the second electronic device, the second projection data to the first electronic device.

8. The method according to claim 6, further comprising:
in response to detecting that a screen of the second electronic device is partially or completely covered with another object, projecting, by the second electronic device, the second projection data to the first electronic device.

9. The method according to claim 6, further comprising:
in response to detecting an operation of flipping a screen of the second electronic device by the user, stopping, by the second electronic device, projecting the screen to the first electronic device.

10. The method according to claim 6, further comprising:
in response to detecting that a screen of the second electronic device is partially or completely covered with another object, stopping, by the second electronic device, projecting the screen to the first electronic device.

11. A screen projection method comprising:
in response to determining that a distance between a third electronic device and a second electronic device is less than or equal to a preset distance, receiving, by the third electronic device, notification information sent by the second electronic device, the notification information indicating that the second electronic device is performing screen projection; and
sending, by the third electronic device, second projection data to the second electronic device in response to receiving the notification information.

12. The method according to claim 11, wherein the sending the second projection data to the second electronic device comprises:
in response to receiving the notification information, prompting a user to perform screen projection on the third electronic device and the second electronic device together; and
sending the second projection data to the second electronic device in response to detecting an operation that the user determines to perform screen projection on the third electronic device and the second electronic device together.

13. The method according to claim 11, further comprising:
in response to detecting an operation of flipping the third electronic device by a user, stopping, by the third electronic device, sending the second projection data to the second electronic device.

14. The method according to claim 11, further comprising:
in response to detecting that a screen of the third electronic device is partially or completely covered with another object, stopping, by the third electronic device, sending the second projection data to the second electronic device.

15. The method according to claim 11, further comprising:
in response to detecting an operation of flipping the third electronic device by a user, stopping, by the third electronic device, sending the second projection data to the second electronic device, wherein the sending the second projection data to the second electronic device comprises:
in response to receiving the notification information, prompting the user to perform screen projection on the third electronic device and the second electronic device together; and
sending the second projection data to the second electronic device in response to detecting an operation that the user determines to perform screen projection on the third electronic device and the second electronic device together.

16. The method according to claim 11, further comprising:
in response to detecting that a screen of the third electronic device is covered with another object, stopping, by the third electronic device, sending the second projection data to the second electronic device, wherein the sending the second projection data to the second electronic device comprises:
in response to receiving the notification information, prompting a user to perform screen projection on the third electronic device and the second electronic device together; and
sending the second projection data to the second electronic device in response to detecting an operation that the user determines to perform screen projection on the third electronic device and the second electronic device together.

\* \* \* \* \*

UNITED STATES PATENT AND TRADEMARK OFFICE
CERTIFICATE OF CORRECTION

| | | |
|---|---|---|
| PATENT NO. | : 12,265,752 B2 | Page 1 of 1 |
| APPLICATION NO. | : 18/284813 | |
| DATED | : April 1, 2025 | |
| INVENTOR(S) | : Wang et al. | |

It is certified that error appears in the above-identified patent and that said Letters Patent is hereby corrected as shown below:

In the Claims

In Column 45, in Claim 1, Line 62, delete "distance the" and insert -- distance, the --.

In Column 47, in Claim 7, Line 7, after "claim 6," delete "wherein the method".

Signed and Sealed this
Twentieth Day of May, 2025

Coke Morgan Stewart
*Acting Director of the United States Patent and Trademark Office*